United States Patent [19]

Judd et al.

[11] Patent Number: 5,687,391
[45] Date of Patent: Nov. 11, 1997

[54] FAULT TOLERANT MULTIPOINT CONTROL AND DATA COLLECTION SYSTEM

[75] Inventors: John E. Judd, Hamden; Kenneth E. Appley, Orange; Salvatore J. DeFrancesco, East Haven, all of Conn.

[73] Assignee: Vibrametrics, Inc., Hamden, Conn.

[21] Appl. No.: 497,652

[22] Filed: Jun. 30, 1995

Related U.S. Application Data

[63] Continuation-in-part of Ser. No. 989,187, Dec. 11, 1992, Pat. No. 5,430,663.

[51] Int. Cl.[6] ................................................. G06F 13/00
[52] U.S. Cl. .................... 395/835; 395/838; 340/825.06; 364/550
[58] Field of Search ........................... 395/184.01, 838, 395/835; 340/825.07, 825.16, 825.06; 364/550, 187

[56] References Cited

U.S. PATENT DOCUMENTS

| | | | |
|---|---|---|---|
| 3,783,680 | 1/1974 | Mason | 73/71.2 |
| 4,153,945 | 5/1979 | Actor et al. | 364/900 |
| 4,155,075 | 5/1979 | Weckenmann et al. | 340/167 |
| 4,415,896 | 11/1983 | Allgood | 324/127 |
| 4,426,697 | 1/1984 | Petersen et al. | 340/825.07 |
| 4,466,288 | 8/1984 | Grynberg et al. | 73/654 |
| 4,530,045 | 7/1985 | Petroff | 364/138 |
| 4,611,491 | 9/1986 | Brown et al. | 73/517 |
| 4,652,821 | 3/1987 | Kreft | 324/208 |
| 4,791,547 | 12/1988 | Petroff | 364/138 |
| 4,905,517 | 3/1990 | Crowe et al. | 73/654 |
| 4,910,658 | 3/1990 | Dudash et al. | 364/138 |
| 4,963,763 | 10/1990 | Minagawa et al. | 340/310 |
| 4,980,844 | 12/1990 | Demjanenko et al. | 364/550 |
| 5,006,841 | 4/1991 | Vines et al. | 340/825.07 |
| 5,089,974 | 2/1992 | Demeyer et al. | 340/310 |
| 5,107,526 | 4/1992 | Ueno et al. | 340/825.52 |
| 5,142,277 | 8/1992 | Yarberry et al. | 340/310 |
| 5,146,401 | 9/1992 | Bansal et al. | 364/138 |
| 5,200,743 | 4/1993 | St. Martin et al. | 340/825.07 |
| 5,512,890 | 4/1996 | Everson, Jr. et al. | 340/870.13 |

*Primary Examiner*—Jack B. Harvey
*Assistant Examiner*—Jeffrey K. Seto
*Attorney, Agent, or Firm*—DeLio & Peterson LLC

[57] ABSTRACT

A multipoint data collection system uses multiple parallel data buses connecting a central controller to addressable sensor interfaces to permit any sensor to be connected to a central controller over any one of the data buses. Both ends of each data bus are connected to the central controller, allowing sensor interfaces to be addressed even if all data buses are cut. Faults on a data bus and defective sensor interfaces may be bypassed through one or more bypass buses that may be addressably switched into use as desired.

18 Claims, 14 Drawing Sheets

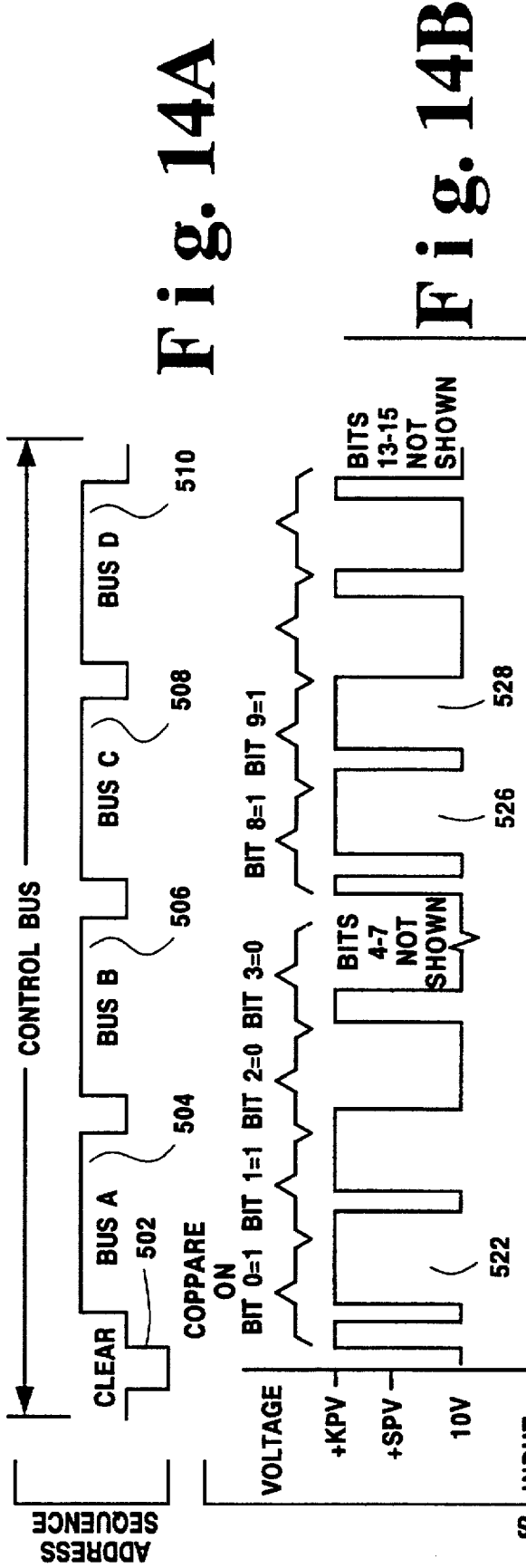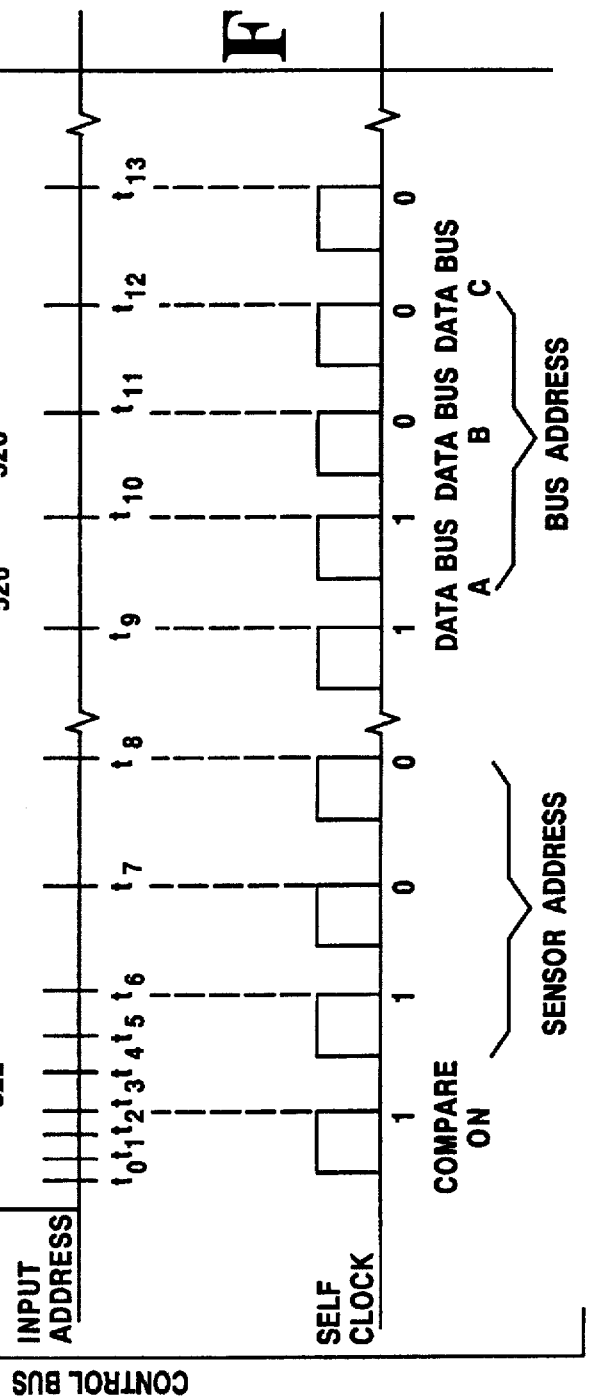

FAULT TOLERANT MULTIPOINT CONTROL AND DATA COLLECTION SYSTEM

This is a continuation-in-part of application Ser. No. 07/989/187 filed on Dec. 11, 1992, now issued as U.S. Pat. No. 5,430,663 granted Jul. 4, 1995.

BACKGROUND OF THE INVENTION

1. Field of the Invention

This invention relates to systems which collect data from multiple sensors and send control signals to multiple control devices installed at various points around a manufacturing site. It is particularly related to systems where the sensors and control devices are uniquely addressable over a common data bus.

2. Description of Related Art

Production line and process machinery needs to be monitored for wear to avoid expensive, unexpected breakdowns. This is often done with accelerometers installed on the bearings of motors, pumps and other critical machinery to monitor the vibration of the equipment. Breakdowns are often preceded by changes in the equipment vibration level. These changes can be detected through regular monitoring, allowing the equipment to be repaired during regularly scheduled maintenance periods.

One method of monitoring the sensors is for maintenance personnel to take regular readings of the vibration levels at the sensors by carrying a portable data storage unit directly to each sensor to collect the data. This is time consuming, but effective.

Another method is for the sensors to be individually hard-wired to a central station. In this arrangement, a separate wire pair runs from each sensor to the central monitoring station or to a multiplexer which is then connected to the central station. This design simplifies the data collection task by allowing the data to be collected from the central station mounted in a convenient location.

In the central monitoring station design, other types of sensors, such as tachometers, pressure sensors, temperature sensors and the like may also be added to the system. This allows production process monitoring to be integrated with the vibration monitoring system.

In large systems, however, the numerous sensors makes the cost of running individual wire pairs from the sensors to the central location or multiplexer a major factor in the total cost of the system. Moreover, vibration sensors used to detect abnormal vibrations caused by wear, usually need to be monitored only briefly at widely scattered time intervals. Thus, prior art systems with a single wire pair running to each sensor has far more data transmitting capacity than is required for the majority of applications. A single data bus shared by the sensors is therefore desirable to reduce cabling cost and complexity.

Although the technique of using a common data bus for connecting to digitally addressable electronic elements is known, it has certain difficulties in a factory environment when implemented for monitoring sensors. One is that all the data from all the sensors passes over a single data bus. In the real world, with a network of sensors spread throughout a factory environment, a single data bus is susceptible to failure. An open circuit on the bus will cause the loss of information from all sensors beyond the open circuit and a short circuit makes communication impossible with any sensor on the bus.

Moreover, if the sensors are powered over the cable, the power transmission capabilities of the cable become a factor. Accelerometers are powered through the data bus wires over which the data is transmitted. Reasonably sized data bus wires do not have the power carrying capacity to continuously and simultaneously power the large number of sensors desired for many installations.

Accordingly, one object of the present invention is to provide a bused data collection system wherein the system includes redundant parallel data buses for fault tolerance in the event that any one bus fails.

Another object of the invention is to provide a design in which each sensor is connected to several data buses, and a central controller can electrically switch any sensor onto any selected one of the data buses.

A further object of the invention is to provide a design in which multiple parallel data buses may be simultaneously used to receive data from different sensors to permit real time direct comparison between the output of the sensors.

Yet another object of the invention is to provide a design in which each sensor may be addressed even if all the data buses are completely cut at one point.

Still another object of the invention is to provide a design in which bad sections of one or more data buses or bad sensors may be bypassed to maintain connection with the sensors.

Still other objects and advantages of the invention will in part be obvious and will in part be apparent from the specification.

SUMMARY OF THE INVENTION

The invention achieves fault-tolerant multipoint control and data collection through the use of a set of redundant parallel two-wire data buses organized into a common cable. A central controller is connected to a plurality of sensors through the cable which connects to a corresponding plurality of addressable sensor interfaces positioned between the cable and the sensor interface. The central controller generates a digital address signal identifying a selected sensor interface and a selected data bus to be used to receive analog data from the selected sensor interface.

In one embodiment of the invention, the address signal is sent over the data bus through bus interfaces connected between the controller and the corresponding data bus. In another embodiment of the invention, the address signal is sent over a separate control bus.

In both embodiments, each sensor interface is connected to all the data buses in the cable and includes an address recognition circuit responsive to the address signal for recognizing its unique address in the address signal and connecting its corresponding sensor to a selected one of the data buses specified in the address signal.

The address signal is composed of a sensor address portion and a bus address portion. This permits the central controller to specify any sensor and any one of the data buses for use.

The first embodiment of the invention uses a method of sharing a single data bus for digital address signals, sensor power and analog data from the sensor. In the simplest form of the first embodiment of the invention, a single data bus is shared for digital and analog data, but in the preferred design of this embodiment, the benefits of the shared bus are multiplied through the use of multiple parallel buses which provide redundancy for fault-tolerant operation. The central controller supplies power to the sensors from a sensor power supply means through the selected data bus. The sensor power means provides power to the sensor, and the sensor uses that power to generate analog data within a carefully controlled and restricted voltage range having a preset upper and lower voltage limit.

The address signal used to select the data bus and the desired sensor is a digital signal, generated by a bus interface, having an on voltage greater than the maximum sensor power voltage and an off voltage which is less than the minimum voltage. This places the controller signal completely outside of the voltage range available for data and permits the sensor interfaces to discriminate between the two on the basis of this difference.

The second embodiment removes the voltage restrictions on the analog data by placing the digital control and address signals on a separate control bus.

In both embodiments, the central controller encodes the sensor and bus address using a self-clocking format in which each data bit of the address is delivered asynchronously and is preceded by a clock bit. This makes the system insensitive to random propagation delays incurred through long cable lengths connecting distant sensors to the controller and allows for adding sensors at random positions.

The sensor interface of the first embodiment includes a circuit means for disconnecting the sensor from the selected data bus whenever sensor power is removed from the data bus.

In the second embodiment of the invention, the cable including the multiple data buses also includes a separate control bus to carry the address signal. In this embodiment, the analog data on the data buses is carried separately from the digital address data on the control bus. In a particular improvement, the data buses have both ends selectably connectable to the central controller. The controller can then use either end of the cable to access any sensor interface even if the entire cable is inadvertently cut in two.

One particularly advantageous feature of the invention is the capability of switching to an auxiliary mode in which the system provides a direct two wire connection from the central controller to any addressable sensor interface location on the system. This allows various types of off-the-shelf control devices and sensors to be used with the system without interfering with the accelerometers that require constant current power in the normal mode of operation.

Another feature is the capability of attaching a remote controller at any point along the cable to replace the function of the central controller. This permits control of the system from any remote location on the system.

Yet another feature of the invention is the provision of a bypass bus connected by way of two addressable interfaces. The bypass bus may be used by addressing the two interfaces connected to the ends of the bypass bus (by means of the address signal) and instructing them to connect themselves to a specified one of the data buses. These two interfaces may be identical to the other sensor interfaces, but do not have sensors connected to them. Instead of connecting sensors when addressed, they connect the ends of the bypass bus to the selected data bus. This allows a bridge to be formed "on the fly" around a trouble spot on one of the data buses through which data can be routed as necessary or to disable a damaged portion of a data bus.

In still another improvement, the system can be provided with a second or third additional cable, each being provided with multiple data buses and a control bus, and each cable forming a loop with both ends connected to the central controller so that additional sensor interfaces may be added thereon.

Another improvement in the second embodiment allows very long cable lengths to be used by providing a long line driver with remote constant current power and a bus driver. A further improvement in this embodiment is the provision of serial and parallel digital data outputs.

BRIEF DESCRIPTION OF THE DRAWINGS

FIGS. 14A, 14B and 14C are graphs of voltage versus time showing signals on the control bus. FIG. 14A shows the clear or reset signal followed by the address signal for each of four different data buses A through D. In this graph only the relative timing of the signals for each data bus has been shown. The details of a digital address for one data bus are seen in FIG. 14B. FIG. 14C shows self clocking data similar to FIG. 5b.

DESCRIPTION OF THE PREFERRED EMBODIMENTS

Figure 1:
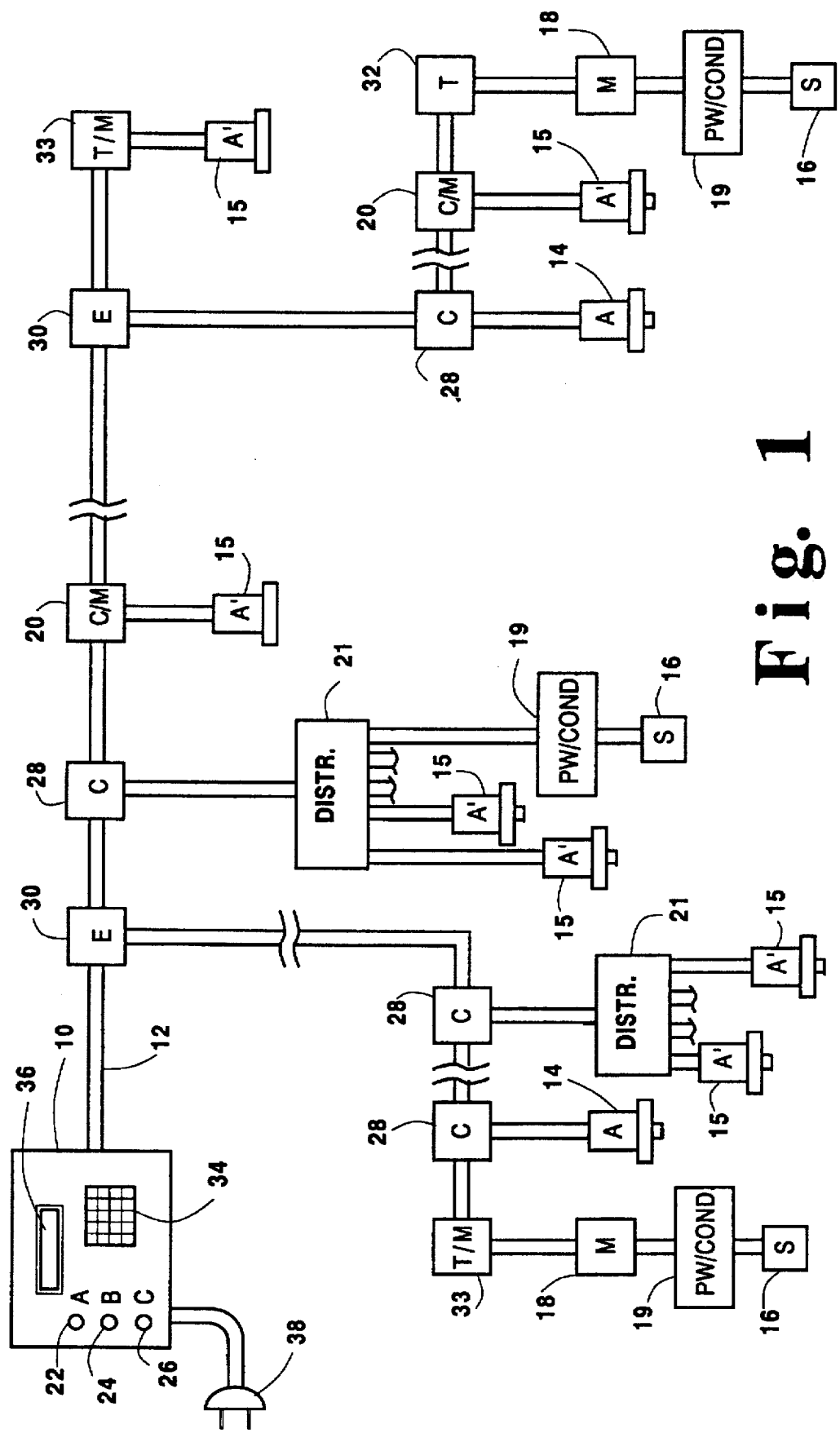
FIG. 1 illustrates the bus layout of the monitoring system of the first embodiment.

Referring to FIG. 1, the invention comprises a central controller 10 connected via a cable 12 to multiple specialized accelerometers 14 (marked A), generic accelerometers 15 (marked A') and generic sensors 16 (marked S). The central controller would normally be installed in a convenient location where data from the sensors may be collected. It accepts input specifying a sensor to be monitored, signals the sensor to connect to a data bus within cable 12, provides power to the sensors and associated address circuitry over the cable and provides the data at an output.

The sensors 14, 15 and 16 are connected to the buses within cable 12 through sensor interfaces, described in connection with FIG. 4. The sensors are typically scattered throughout a manufacturing facility mounted at various critical monitoring points. By way of example, accelerometers are often mounted in vibrational contact with the bearings of rotating machinery.

Each sensor has its own sensor interface which stores a unique address, permitting the central controller to specify particular sensors via the address of the corresponding sensor interface. In specialized sensor type 14, which in the preferred design includes some or all of the accelerometers, the sensor interface is located within the case housing the sensor. This provides a convenient one piece assembly, particularly for accelerometers which comprise the majority of the sensors in many installations.

The generic sensors 16 can be any one of a wide variety of off-the-shelf sensors which are available to measure pressure, temperature, speed, strain, flow rate, or any other desired physical parameter. Such sensors do not have the desired integral sensor interface, so it is provided separately. Generic accelerometers 15, which also lack the sensor interface may also be used with the system with the advantage that existing vibration monitoring systems may be upgraded without the necessity of replacing all the accelerometers.

For sensors without the integral sensor interface, the interface may be located at any one of a number of suitable locations as shown in FIG. 1. One such location is within a module 18 (marked M) dedicated to the sensor interface function. A power and signal conditioner 19 (marked PW/COND) is also shown positioned between the sensor and the interface module. Its function is to provide any specialized power that the sensor 16 may need and to convert the sensor's output signal to a form compatible with the monitoring system. The operation of power and signal conditioner 19 depends upon the individual requirements of the particular sensor attached to it, so it is not described in detail, but it produces an analog output signal similar within the same voltage range as the accelerometer output signal described below.

Accelerometer types 14 and 15, and many generic sensors can be supplied with power over cable 12 from power sources within, or connected to, the central controller 10. However, some specialized sensors are powered more conveniently from power sources within the power conditioners 19 which may need separate connection to external power sources.

Other suitable locations for the module containing the sensor interface are within the connector 20 (marked C/M) making connection to the cable 12, within a terminator connector 33 (marked T/M) or within a multiple sensor distribution box 21 (marked DISTR.). The multiple sensor distribution box is connected to the cable 12 with a single connector 28, but contains several sensor interfaces, each with its own unique address, and each corresponding to one of multiple sensors connected to it.

Regardless of where the sensor interface is installed, the sensor is ultimately connected to the cable 12 through the sensor interface via a connector which may take the form of a standard connector 28 (marked C), a connector with integral sensor interface 20 (marked C/M), a terminator 32 (marked T) or a terminator with integral sensor interface 33 (marked T/M).

The connector makes connection to wire pairs within the cable 12 which act as multiple parallel buses to carry power and data to and from the sensors. The preferred design for the system uses a cable 12 with an internal ribbon cable folded within a round outer sheath. The sheath may be opened at perforated junctions spaced along its length to expose the ribbon cable which is then unfolded to a normally flat shape.

Connection to the flattened ribbon cable is made with standard insulation displacement connectors (IDC), the socket portion of which is attached to the flattened ribbon cable and the plug portion of which is attached to the sensor interface. This arrangement permits the sensors to be quickly attached to the cable at any location along its length and repositioned or replaced as necessary.

The IDC connectors make contact with the wire pairs in cable 12, without interrupting them. Any connector capable of making such a connection to the wires in the cable, and any cable configuration containing multiple accessible wires would also be suitable. The connectors 28 may be provided with impedance matching circuitry, if necessary, in accordance with conventional bus design techniques.

Extension connectors 30 (marked E) provide a means of branching the cable 12. They are similar to the connectors 28 in that they are also IDC-based connections, but they connect a branch of the cable 12, containing multiple additional sensors along its length, instead of a single sensor. Terminator connectors 32 (marked T) are similar, but include a standard resistive termination network to prevent ringing on the bus.

In the preferred design shown, the ribbon cable inside cable 12 includes three parallel wire pairs referenced externally as data buses A, B and C. Those familiar with the art will recognize that more than three or as few as one data bus may be used to increase or decrease the fault tolerance of the data collection system. Even a single data bus design has advantages over direct wired prior art data collection systems by virtue of the fewer wires it employs.

Figure 2:
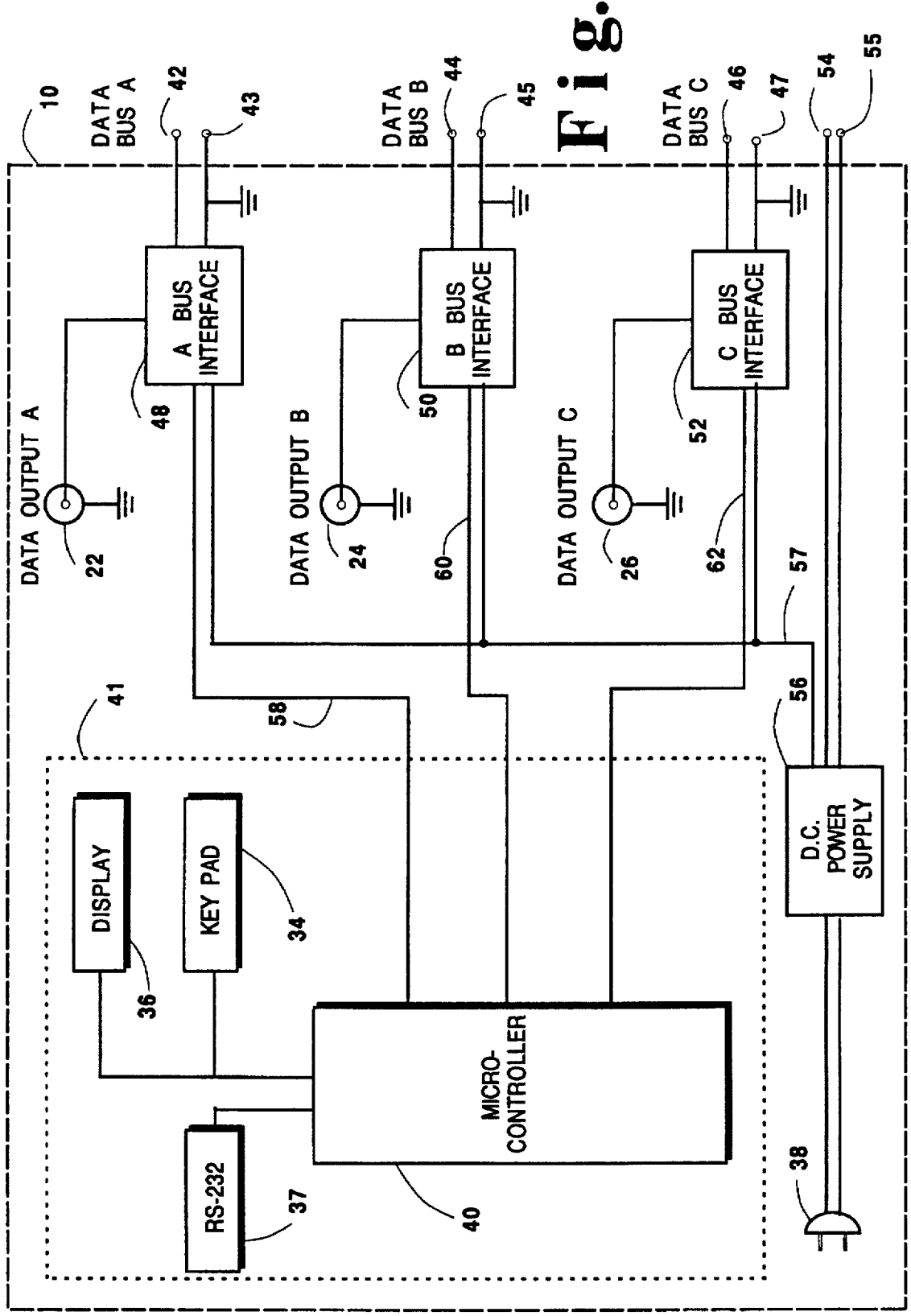
FIG. 2 is a circuit diagram in block diagram form showing the central controller of the first embodiment.

Referring to FIG. 2, the data bus wire pair for data bus A includes a signal wire 42 and a corresponding ground wire 43. The data bus wire pairs for data buses B and C include signal wires 44 and 46 and ground wires 45 and 47. As described below the data buses A, B and C are referenced by the controller 10 digitally in a bus address portion of an address signal.

The data buses A, B and C are connected to data outputs 22, 24 and 26 on the central controller 10 through corresponding bus interfaces 48, 50 and 52 (see FIG. 2). These outputs are provided so that a portable data storage unit may be connected to any one of them to receive data from a selected sensor over the corresponding data bus.

In the preferred design, the cable 12 also includes at least one, and preferably two, additional wire pairs arranged as keep-alive power buses, to power the sensor interfaces. They supply power to operate the digital address circuitry in the sensor interfaces so that they can recognize their address when selected and connect their sensor to the data bus. The sensor itself is not powered over the keep-alive power bus, but, instead, is powered over the selected data bus.

The address circuitry in each sensor interface simultaneously monitors all of the data buses. The central controller 10 specifies an interface and a data bus via an address signal containing the address of the desired interface and the bus to be used. This signal is sent to a bus interface where it is formatted and placed on a data bus. Each sensor interface receives the signal, and the sensor interface whose internally stored address matches the address in the signal connects its sensor to the data bus specified in the bus portion of the address signal so that data transmission can begin.

The address circuitry requires very little power compared to the sensor, and a large number of sensor interfaces may be simultaneously powered on the keep-alive bus. The second keep-alive power bus may be used as a spare, or, where the number of sensors is so large that the power transmission capability of one keep-alive power bus is exceeded, the sensors may be split between the two buses.

The controller is powered via a standard AC power connection 38 and includes an input means 34, used to tell the controller what sensor is to be activated and which data bus should be used to send the data from that sensor. For manual operation, the input may be a keypad 34, as shown in FIG. 1 or a keyboard. These allow a sensor address to be entered manually as well as the desired bus.

Alternatively, the system may be set up for more automated operation under the external control of a computer or an automated data storage unit in which case an RS-232 serial interface or a direct connection to a computer bus may be used as the input. These inputs may be used instead of, or in addition to, a keypad or keyboard. In each case, the principal function of the input means is to specify the address of a sensor to be powered up for data collection and a bus over which the data is to be transmitted.

The central controller also includes an output means for signaling the status of the controller. This may take the form of an LCD display 36, as shown in FIG. 1. It may also include an RS-232 serial interface, a computer monitor, a connection to a computer bus or any combination thereof. The output is used to supply information either directly to a user of the system or to an automated data collector. The information may include such items as the address of the currently selected sensor, which of the data buses are in use, whether data is arriving on the buses and whether the data is good and is not being distorted through clipping.

Referring to FIG. 2, a microcontroller 40 performs the job of managing system operation and translating between the input and output means 34, 36 on the one hand and the data collection system on the other. It performs such functions as accepting data from the keypad when keys have been pressed, interpreting the input specifying the sensor and bus, preparing a digital address signal, turning on certain trigger signals to activate portions of the bus interface, monitoring to see if arriving data is good, sending status information out the output and other timing and sequencing functions to coordinate the system operation.

An optional digital input/output means such as the RS-232 connection 37 may be used instead of or in addition to the input/output means 34, 36 to permit automated control of the system from a computer or portable data logger.

As those familiar with conventional microcontroller circuits will recognize, the microcontroller will also include additional support chips (not shown), such as buffers, a programmable read only memory (PROM) to store an input/output program which controls the microcontroller operation, and a random access memory (RAM) which may be part of the microcontroller chip or separate. All of these support chips would be contained within the control section 41 of the central controller 10, and the design of the microcontroller based control section 41 is entirely conventional.

The data from the specified sensor arrives at the central controller over one of the specified two-wire data buses 42–43, 44–45 and 46–47, and is made externally available for recording by a data logger or other device at data outputs 22, 24 and 26. The data buses are connected to the central controller through three substantially identical bus interfaces 48, 50 and 52.

The microcontroller 40 controls operation of the bus interfaces over control buses 58, 60 and 62. The control buses include multiple control and status lines, described fully in connection with FIG. 3, for sending and receiving digital signals to and from the bus interfaces.

In addition to the six wires of the three data buses, the cable 12 includes two wires of the keep-alive power bus 54, 55 driven by the DC power supply 56. The DC power supply also powers the microcontroller 40, the bus interfaces 48, 50, 52 and through them, the sensors over the data buses. Additional two-wire data buses and/or keep-alive power buses may be incorporated into the cable 12 to provide additional data and/or power pathways.

The DC power supply 56 generates at least three distinct voltages to power different portions of the circuitry, +KPV, +SPV and +DPV. Power line 57 is shown to emphasize the fact that power is sent to the bus interfaces and from there to the sensors over cable 12. Other parts of the central controller are also powered in a conventional fashion although the power connections are not shown.

The highest voltage supplied by DC power supply 56 is the keep-alive power voltage (+KPV). This is the voltage supplied to the address circuitry over the keep-alive bus 54–55. As described below, this voltage is also used as the binary "on" voltage in the digital address signal sent over the data buses. The off voltage is essentially zero volts.

The second, and next lower voltage is sensor power voltage (+SPV). This voltage is used to supply the constant current sensor power source 86. The sensors set up a bias voltage that is less than +SPV on the data buses, with the AC analog data fluctuating around the bias voltage. The analog data voltage can never exceed SPV, and this difference is used to prevent analog data from being confused with digital data which is always 0 or +SPV. Restrictions on the minimum voltage level of the analog data makes the voltage ranges for valid digital data and valid analog data mutually exclusive.

The last, and lowest voltage level is digital power voltage (+DPV). This voltage is used to power many of the digital integrated circuits.

Figure 3:
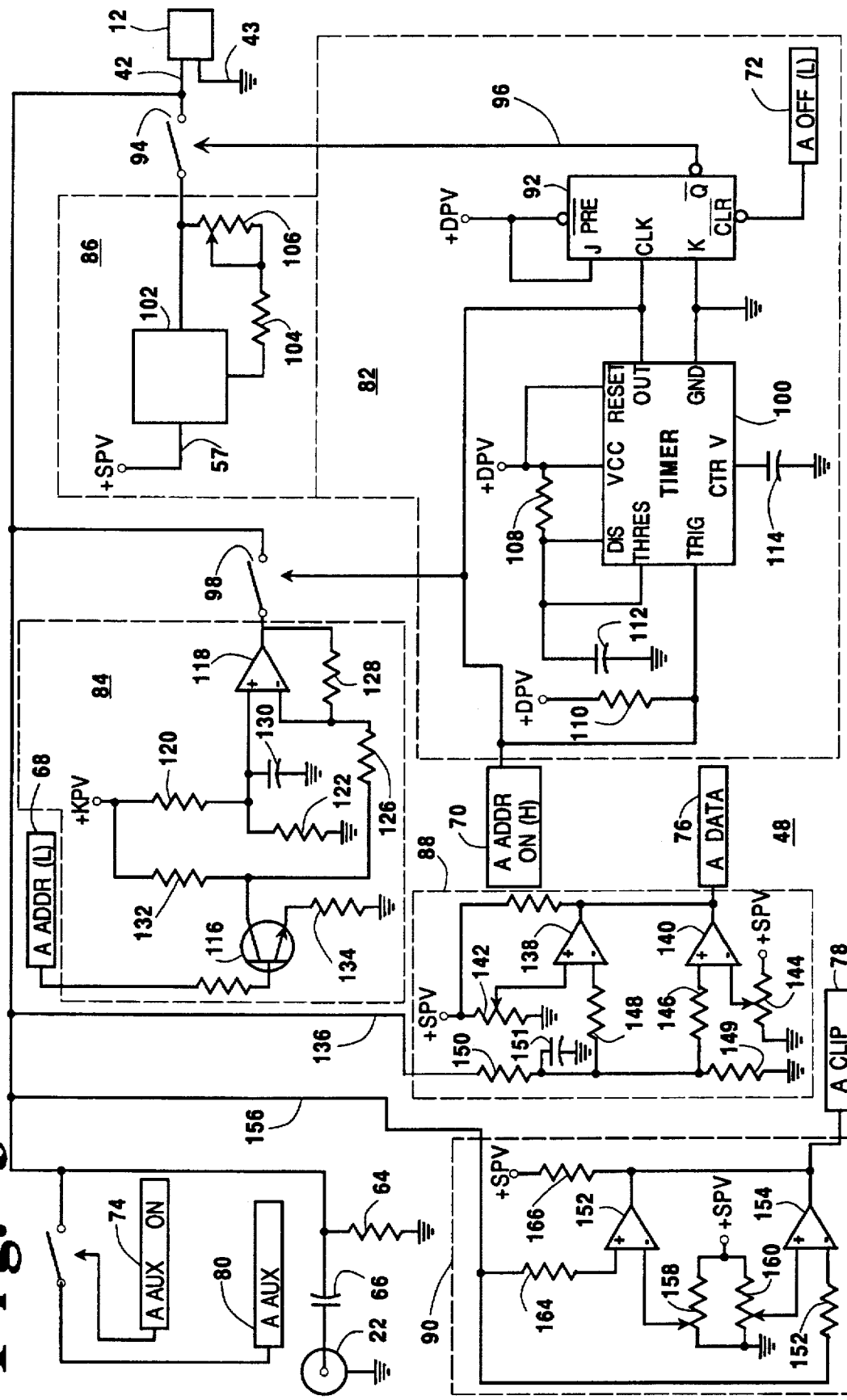
FIG. 3 is a circuit diagram of a bus interface in the central controller of the first embodiment as shown in block form in FIG. 2.

Turning now to the bus interfaces, FIG. 3 provides a detailed circuit diagram for bus interface 48 connected to data bus A. As the three bus interfaces 48, 50 and 52 are identical, only bus interface 48 will be fully described.

Digital control signals from the microcontroller 40 are sent to the bus interface 48 over various control lines marked "A ADDR" 68, "A ADDR ON" 70, "A OFF" 72, and "A AUX ON" 74. Digital status signals from the bus interface are sent to the microcontroller 40 over status lines marked "A DATA" 76 and "A CLIP" 78. The line marked "A AUX" 80 is an auxiliary DC connection to the sensors over the data bus 42. It may be used to supply power over the data bus to any sensor that may require non-standard power, or it may be used for DC data output.

Generally, however, AC data output is provided at data output 22 from data bus 42 through a conventional AC output network composed of resistor 64 and capacitor 66. They transmit the AC data signal and block the DC bias on the data bus during the interval when data is being transmitted.

The control and status lines referred to herein are part of the control bus 58 on FIG. 2, and the labeled control and status lines 68–80 in FIG. 3 terminate at addressable inputs and outputs of the microcontroller 40. The microcontroller 40 also includes corresponding control and status lines for the other two bus interfaces 50 and 52 within the control buses 60, 62.

The bus interface 48 performs the following; essential functions:

1. It receives a digital address signal from the microcontroller 40 specifying a sensor address and a data bus, formats the address signal by shifting its voltage from conventional zero to five volt TTL voltage levels to zero to +KPV levels to enable the sensor interfaces to recognize it as a digital address, and then transmits the signal over the data bus 42–43.
2. It times a delay period during which the address signal is sent, then applies a constant current power to the data bus 42 in order to set up the bias voltage and power the selected accelerometer sensor.
3. As data begins to arrive on the data bus 42, the bus interface 48 monitors and tests that data and signals the microcontroller a) that data is now arriving and b) that the data is within the operating range.
4. At a subsequent point in time, upon command from the microcontroller, the bus interface disconnects power from the data bus 42 which resets all the sensor interfaces to a standby mode in which they await a new address signal.

These functions are principally performed by a timer circuit 82, an address circuit 84, a sensor power supply 86 and two (2) data monitoring circuits 88 and 90.

The first step in a data collection cycle is for the microcontroller 40 to insure that the sensor power is turned off on the data line 42 by switching the A OFF line 72 low. This clears flip-flop 92 and opens FET electronic switch 94 which is connected to the flip-flop 92 over line 96. Clearing the flip-flop output opens switch 94 and disconnects the sensor power supply 86 address bus 42.

When the sensor power is removed from data bus A, any previously selected sensor that is connected to and drawing sensor power from that data bus will disconnect, reset and switch to the standby state.

Next, with the data bus clear, the microcontroller 40 signals the bus interface that an address is to be sent over data bus A by turning the A ADDR ON line 70 high.

Turning line 70 high closes FET switch 98, connecting the address circuit 84 to the data bus 42 and simultaneously starts the timing cycle of timer circuit 82.

Timer circuit 82 will then begin to count out a preset timer period via a 555 timer 100, as set by the RC time constant of resistor 108 and capacitor 112. At the end of the preset time period, the output of timer 100 will flip the state of J–K flip-flop 92, closing switch 94 and supplying sensor power from the sensor power circuit 86 to the data bus 42.

Within the preset time period generated by timer 100, the microcontroller 40 needs to generate an address signal specifying the desired sensor, and send that signal to the bus interface so that the appropriate sensor can be connected to data bus 42 to receive the power. In the preferred design, timer 100 generates a delay of at least 100 milliseconds after the A ADDR ON fine 70 goes high before it switches the state of J-K flip-flop 92.

Once the A ADDR ON line 70 is turned high, the address signal is sent from the microcontroller 40 to the address circuit 84 over control line 68. The address signal generated by the microcontroller includes two portions. The first portion is the address of the sensor interface connected to the sensor from which data is to be collected.

The second portion identifies the bus over which the data is to be sent. The A bus interface 48 will be used to signal to a sensor that data should be transmitted over the A data bus 42–43, the B bus interface 50 will be used to signal to a sensor that data should be transmitted over the B data bus, etc.

The address circuit 84 is basically a voltage level shifter, converting the address signal generated by the microcontroller 40 from its original zero (off) to five volt (on) levels to a zero (off) to +KPV (on) digital address signal before it is sent on to the data bus 42.

When timer 100 times out, it opens switch 98 and flips the state of flip-flop 92 closing switch 94 thereby disconnecting the address circuit 84 from the data bus and connecting instead sensor power supply 86.

Sensor power supply circuit 86 includes a three terminal power regulator 102 configured as a constant current source by resistors 104 and 106. Because the power supply is powered with a maximum voltage of +SPV which is less than KPV, the analog sensor data voltage cannot exceed +SPV and cannot be confused with digital address signals which are either off or +KPV in magnitude.

Bias/impedance converter circuitry at the accelerometer (see FIG. 6) sets up a nominal bias voltage of 50% of +SPV from the current supplied by the sensor power circuit 86. This circuitry also limits the minimum voltage of the data from the sensor which prevents the address circuitry on other sensor interfaces from confusing data with address signals from the microcontroller 40. The absence of bias voltage when the sensor power circuit 86 is disconnected by switch 94 can be uniquely detected in the sensor interface to reset the selected sensor and take it off line.

The constant current source is particularly suited for powering accelerometers. For other types of sensors requiring different forms of power, the A AUX line 80 may be used to supply power, provided that it is limited to the voltage range of minimum data voltage to +SPV as previously described. The connection of the A AUX line is controlled over the A AUX ON line 74 by the microcontroller.

The address circuitry 84 shifts the voltage level of the incoming address bits on A ADDR line 68 so that a digital "on" is +KPV. The address pulses from line 68 switch transistor 116. When the A ADDR line goes high, transistor 116 conducts, the voltage at the collector of transistor 116 shifts low, which drops the voltage at the inverting input of comparator 118 below the voltage set by the biasing resistors on the non-inverting input of 118 causing the output of 118 at switch 98 to shift high to approximately the full +KPV voltage.

If the sensor interface, to be described below, is operating properly, the sensor interface corresponding to the address specified in the address signal just transmitted will have connected its sensor to the A data bus and the biasing circuitry thereon will have set up a bias voltage on the A data bus of approximately 50% of +SPV. Analog data ranging between the minimum data voltage and +SPV will begin to appear on data bus A as the sensor operates, and this data passes to data output A through capacitor 66.

To verify that good data is arriving, the voltage on data bus A is monitored by modules 88 and 90. Module 88 monitors the DC bias voltage, and module 90 monitors the AC voltage to verify that the signal is in the valid range and is not being distorted as a result of clipping or saturation.

Module 88 monitors the A data bus signal line over wire 136 through resistor 150, which with capacitor 151 and resistor 149 acts as a low pass filter and essentially shorts the AC component to ground. Comparators 138 and 140 set up a voltage window around the expected bias voltage and signal the central controller 40 by turning the A DATA line 76 high whenever the bias voltage is good. This signals that data is available on the A data bus. Typically, the microcontroller will then turn on an indicator in the display 36 or signal an automatic data collector that data can now be collected.

If the bias voltage goes too high, comparator 138 will switch its output low, turning of the good data signal on A DATA line 76. If the bias voltage goes too low, comparator 140 will switch its output low, turning off the data available signal on A DATA. Either situation will signal the microcontroller that good data is no longer available.

The monitoring circuit 90 operates in a similar manner to the monitoring circuit 88, except that it lacks the low-pass filtering. It includes two comparators, 152 and 154 connected to the data bus 42 over line 156 through resistors 162 and 164. The comparators 152 and 154 set up a much wider comparison window to monitor the AC nature of the data signal than was set up with the DC monitor in module 88. Resistors 158 and 160 are adjustable to set the voltages at which the comparators turns off the signal on A CLIP 78.

If the swings of the AC signal fall outside of the wide voltage window set by comparators 152 and 154, one of the comparators will switch its output low as long as the voltage is outside its window. The A CLIP data line 78 will then go low, signaling the microcontroller 40 that the data is not good.

Figure 4:
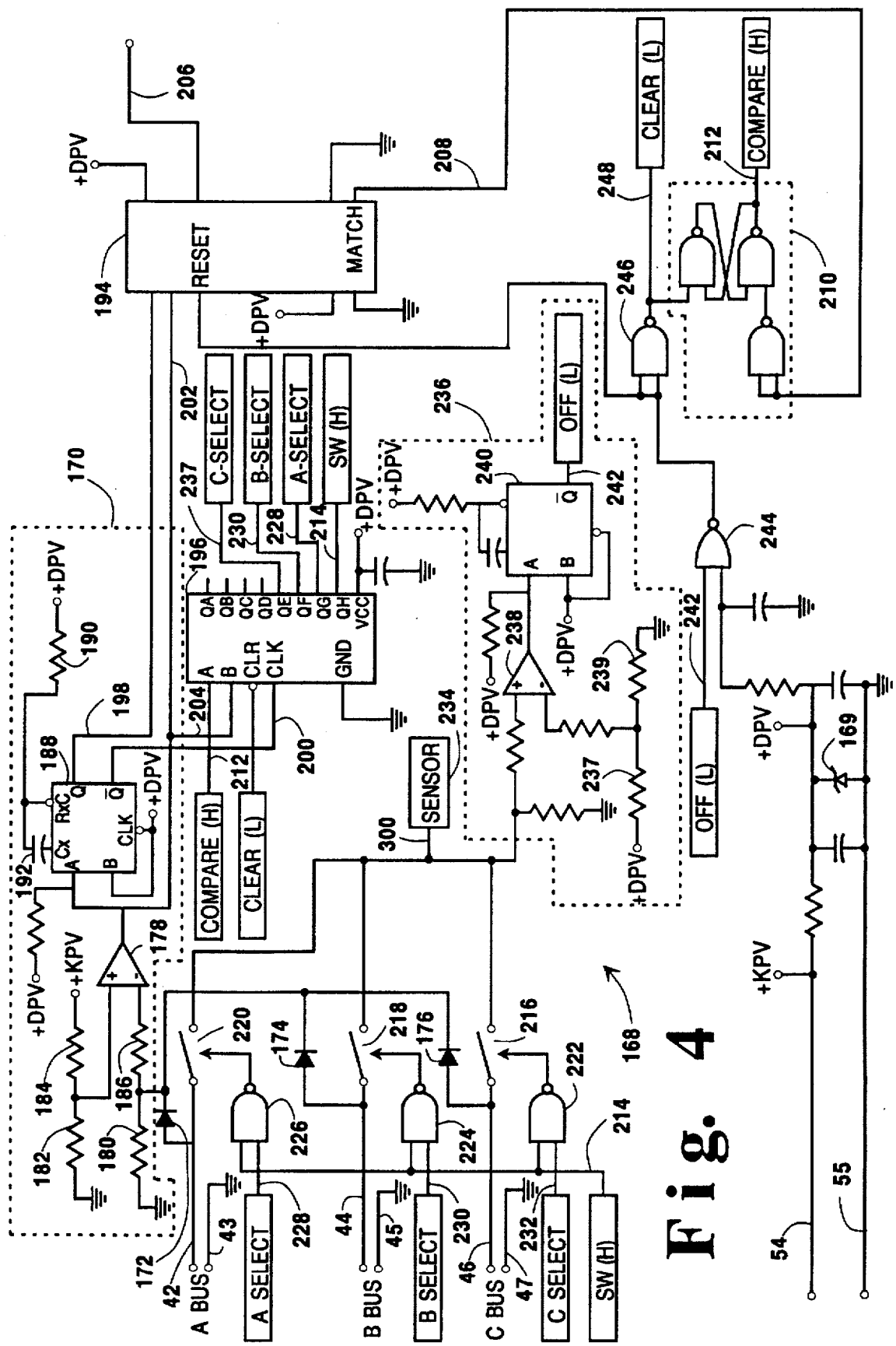
FIG. 4 is a circuit diagram of a sensor interface as used in the first embodiment.

FIG. 4 presents the circuit diagram for a sensor interface 168. The sensor interface 168 may be mounted in the housing for an accelerometer 14, in a separate interface module 18, in a terminator 33, in a bus connector 20 or in a multiple sensor distribution box 21. Each sensor interface is identical except for the unique address stored within it.

Power is supplied to the sensor interface circuitry through the keep-alive power bus 54, 55 carrying +KPV. This voltage is used to generate a reference voltage in the detection of the digital pulses on the data buses. It is also used in a conventional way to produce a lower voltage power, +DPV, for the digital circuitry through zener diode 169 and the associated resistors and filtering capacitors.

Each sensor interface 168 is connected to all three data buses 42–43, 44–45 and 46–47 and to the keep alive power bus 54–55. The data buses are directly connected to an address detector 170 through diodes 172, 174 and 176.

The address detector first performs a voltage level detection with comparator 178 which passes only the +KPV digital address signals as set by the biasing resistors 180, 182, 184 and 186. Voltages at +SPV and below do not pass through comparator 178.

Because the sensors in the system may be located at varying distances from the central controller, delays of varying duration are introduced during propagation of the address signals. To avoid problems due to the unknown length of these delays, each data bit in the address signal is preceded by a clock bit. This "self clocking" is more fully described in connection with FIG. 5 below, however, the clock bit is used to trigger flip-flop 188 to produce a timed output pulse set by resistor 190 and capacitor 192 which strobes in the address bit immediately following the clock bit. This timed output pulse has a trailing edge that falls within the data bit that follows the clock bit.

The resulting output pulse from 188 is fed from the Q output to the address comparator 194 and from the not Q output to the serial to parallel converter 196 over lines 198 and 200, respectively. The address bits which are following the clock bits are also fed to the address comparator 194 and serial to parallel converter 196 over lines 202 and 204. The trailing edge of the timed pulse from 188 causes the address comparator 194 and serial to parallel converter 196 to read the data bits on lines 202, 204. (Actually, as described below, the input gate of serial to parallel converter 196 is only open during the bus address portion of the address signal, so it will only read data bits within this portion.)

Address comparator 194 includes an E2ROM for storing the unique address of this sensor interface. The preferred device for this function is a programmable 16 bit code detector such as an HC2063. The stored "code" is the unique address of the sensor interface, and it can be entered or changed electrically over control bus 206. This is usually done at the time the sensor is installed as the control bus is not connected to the data bus. The control bus typically includes a program line, a clock line, a data line, and lines for reading and modifying the data in the E2ROM.

The address comparator 194 needs an initial "on" bit to begin its compare, so the initial bit of the sensor address field is always one. This bit is labeled "Compare On" in FIG. 5.

Upon receiving an address which matches the stored address, address comparator 194 switches output line 208 high causing the bistable flip-flop 210 to switch the COMPARE (H) line 212 high. COMPARE (H) is a match signal signaling that this sensor has been selected. It is connected to the A input of serial to parallel converter 196. The A and B inputs to converter 196 are the inputs to an AND gate, so until the COMPARE (H) line 212 switches high, the address bits arriving at the B input on line 204 are blocked.

The COMPARE (H) line switches high after the arrival of the first 8 bits (specifying the matching sensor address) in the 16 bit address signal. The remaining address bits (which specify the data bus to be used) are then passed into the serial to parallel converter.

A complete address signal, shown in FIG. 5a, includes a sensor address field and a bus select field. In a single data bus design, the bus select field may be eliminated. Each field comprises eight data bits, each data bit being preceded by a clock bit. The clock bit has a duration which is half the duration of the data bit. It triggers the address detector 170 to generate a pulse (see FIG. 5b), the trailing edge of which fails within the middle of the immediately following data bit. This bit by bit self clocking avoids any problems in timing due to long cable lengths.

The first data bit of the sensor address field is labeled "Compare On", and the first bit of the bus select address is labeled "SW (H)". These first bits of each field are always on, i.e. a digital one. Setting the first bit of each field on simplifies the address circuitry. The remaining seven bits in each field are the sensor address or the data bus address. In the preferred embodiment, only the first three bits of the seven bits available for the bus address, are used. The bits are set in a one-to-one correspondence with the three data buses. The seven bits of the sensor address are a conventional binary number.

Compare On which is Bit 0 of the eight bit sensor address field occurs between time $t_0$ and time $t_4$. The clock bit 250 corresponding to that data bit occurs from time $t_0$ to $t_1$, and the data bit 252 (always a one) occurs from time $t_2$ to $t_4$. In the period after the clock bit and before the data bit the voltage always drops to zero generating a distinct trailing edge from the clock bit. The trailing edge of the clock bit 250 will trigger flip-flop 188 producing timed pulse 254 (FIG. 5b) whose trailing edge will strobe 194 and 196 to read in the subsequent data bit at about time $t_3$, right in the middle of that data bit.

Bit 1 (the second bit of the address field and the first significant bit of the address) begins at time $t_4$. It has a preceding clock bit 256 from $t_4$ to $t_5$, which because the preceding data bit is a one appears as a continuation of that bit. However, it is the trailing edge of each clock bit that produces the timed pulses from 188 shown in FIG. 5b, and the trailing edge will always be distinct. At time $t_6$ the pulse 258 reads in data pulse 260 (another one).

Bit two (the third bit of the field) includes clock bit 262 whose trailing edge starts pulse 264. The trailing edge of pulse 264 reads in the data bit (a zero) at time $t_7$. All the remaining bits are read in the same manner with the clock bit generating a pulse in flip-flop 188 (shown in FIG. 5b) whose trailing edge occurs in the middle of the data bit. Not shown are bits 4–7 of the sensor address field and bits 13–15 of the bus address field.

The three data bits following SW(H) correspond to the three data buses. In the bus address field, bus A has been selected because data bit 266 is on and buses B and C are not selected because their corresponding data bits are off.

The complete address signal shown in FIG. 5a comprises the Compare On bit (always a one), a seven bit binary sensor address, (the first three bits of which are shown as 1, 0 and 0, and the last four bits of which are not shown), SW(H) (always a one), three bits for the bus address (shown as 1, 0, and 0 indicating the A data bus is to be used), and four unused bits (but which could be used for additional data buses).

The entire transmission of the 16 bit address signal occurs during the time period set by timer 100 in the bus interface. After this time period, timer 100 will time out, and switch 94 will close, connecting the sensor power to data bus A. Data will then begin to arrive on the data bus as shown. It will be restricted in voltage between the minimum data voltage and +SPV as previously described.

Referring back to FIG. 4, the COMPARE (H) line on 212 prevents input into the serial to parallel converter 196 until a matching address has been recognized by address comparator 194. The serial to parallel converter acts as a bus select means. Once the input is opened by a digital high on COMPARE (H), the bus address is switched into 196 and steps down the eight parallel outputs QA through QH. Using as an example the bus address from FIG. 5, once the bus address has fully entered the eight bit converter 196, SW (H) (which is always high) will be at output QH and the bit corresponding to data bus A be at output QG. The bit corresponding to data bus B will be at output QF, and the bit corresponding to bus C will be at output QE.

SW (H) is also connected to line 214 at the bus AND gates 222, 224 and 226. This prevents the bus select switches 216, 218 and 220 from operating until the complete bus select address has been entered into the converter 196. Before the bus select address has entered, all of the outputs QA–QH will be low. Because the first bit in the bus address portion, SW (H) is always a one, the line 214 will switch high when the bus select address has fully entered the converter 196. When line 214 goes high, the AND gates 222, 224 and 226 will permit the appropriate bus select line 228, 230, 232 to trigger the corresponding bus select switch 216, 218 and 220 to connect the sensor 234 to the specified data bus through the impedance converter shown in FIG. 6.

The sensor 234 continues to send data along the data bus until sensor power is removed by the opening of sensor power switch 94 responsive to the signal in the A OFF line 72 from the central controller.

With sensor power removed from the data bus 42, the reset circuit 236 composed of voltage comparator 238 and flip-flop 240 acts to switch the OFF line 242 low. Voltage comparator 238 senses the drop in voltage on the data bus. Whenever the data bus voltage drops below the reference voltage set by voltage divider resistors 237 and 239, flip-flop 240 is triggered, changing the not Q output, which lowers OFF line 242.

OFF line 242 triggers gate 244 and NAND gate 246 set up as an inverter. CLEAR line 248 then clears the serial to parallel converter 196, causing output line 214 to lower, and opening all of the data bus switches 220, 218 and 216. The sensor interface circuit is then in the standby state awaiting the next address signal that will turn it on and connect its sensor to a data bus.

Figure 6:
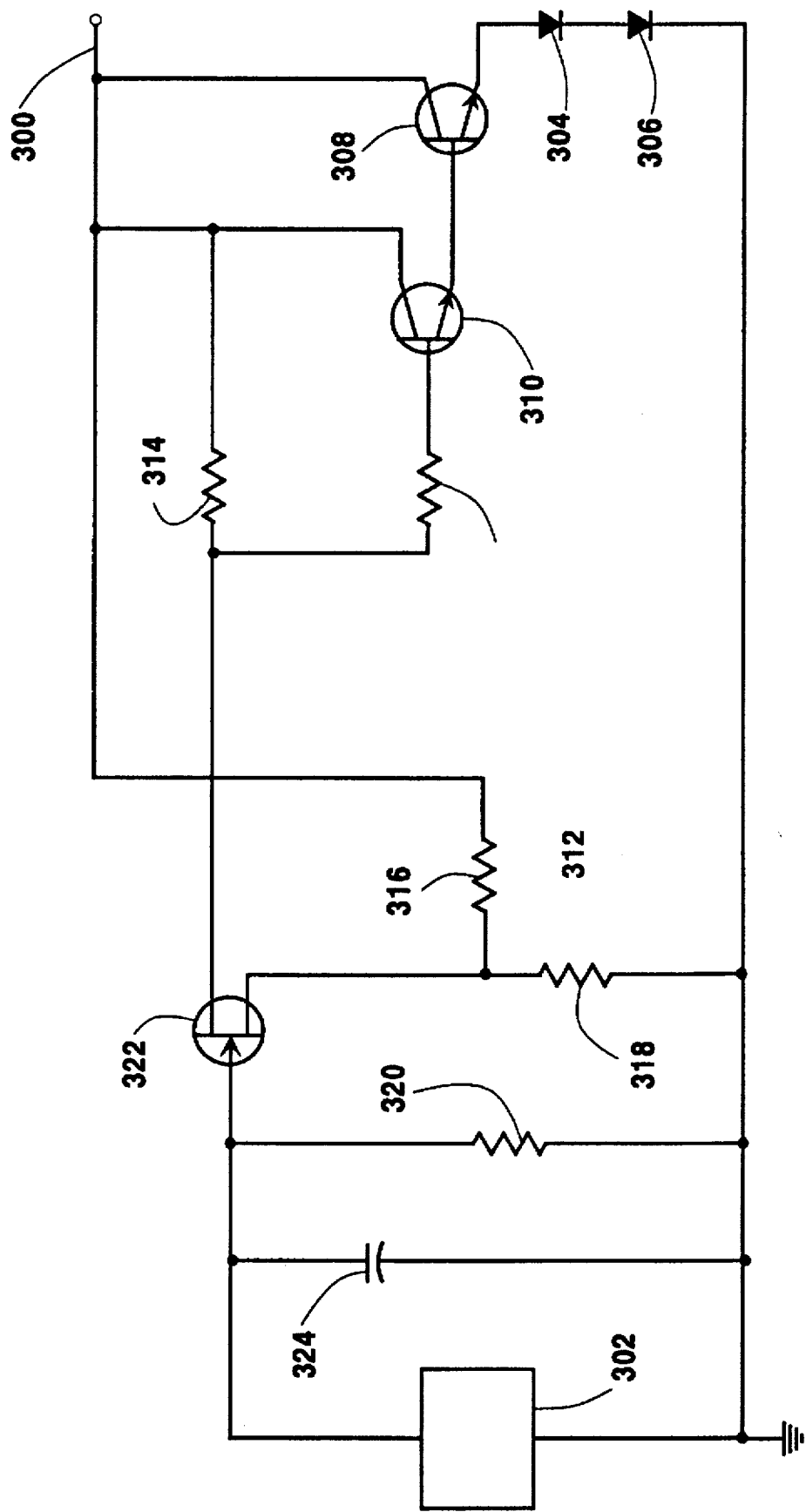
FIG. 6 is a circuit diagram of bias/impedance converter circuitry suitable for use with the accelerometers.

Sensor 234, which may be any one of a variety of different sensors, is connected to the switch selected data bus via wire 300. As an example, FIG. 6 shows a conventional piezoelectric accelerometer sensor 302 with an impedance converter and necessary adaptations for use with the present invention.

The principal change from standard impedance converter design is the use of diodes to maintain a minimum output voltage before the signal is coupled to the data bus. This minimum voltage prevents inadvertent operation of the reset circuit 236 which would cause the sensor interface to disconnect from the data bus and reset to standby mode.

Recalling that the sensor power supply is a constant current source, the biasing circuitry of sensor 234 sets up a nominal bias voltage which is 50% of the maximum sensor power voltage +SPV. The vibration signal from the piezoelectric sensor 302 is an AC signal imposed upon this DC bias voltage. The upper limit of the signal is controlled by the maximum voltage +SPV and the lower limit of the signal is controlled by diodes 304 and 306. Diodes 304 and 306 are silicon diodes, with a nominal voltage drop of 0.6 volts in each.

Figure 5:
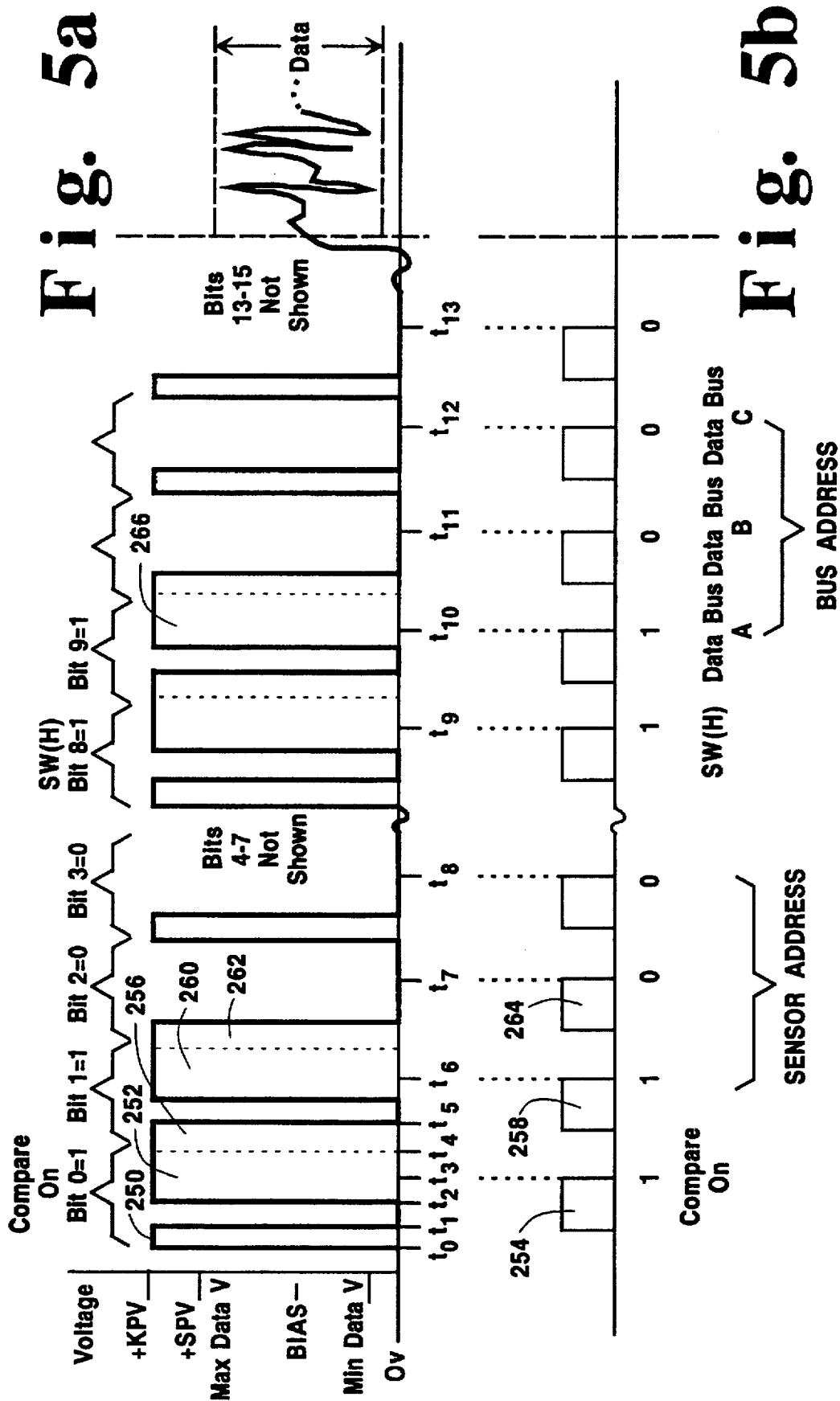
FIG. 5a is a graph of voltage versus time showing the transmission of a digital address signal on a data bus followed by receipt of analog data from the selected sensor on the same bus as occurs in the first embodiment of the invention.
FIG. 5b is a graph of voltage versus time showing the pulses generated by address detector circuitry and used to read the self clocked data in the address signal.

Even if output transistor 308 is saturated, the output voltage on wire 300 will be no less than the voltage over these two series mounted forward biased diodes. With transistor 308 in cutoff, the output voltage will be no more than the full +SPV. At either limit, the voltage will be within a restricted range that is above the value for a digital zero in the address signal (voltage off) and below the value for a digital one (+KPV) as shown in FIG. 5.

The remainder of the impedance converter is standard. The piezoelectric sensor 302 generates an AC voltage when subjected to vibrations. The signal is amplified through FET 322 which modulates the constant current through transistors 310 and 308. Capacitor 324 and resistor 320 form the input load and bias FET 322. Resistors 318 and 316 are for additional bias and negative feedback. Resistor 314 is a load for FET 322. The output voltage on the data bus is the collector to emitter voltage on transistor 308 plus the voltage drop over diodes 304 and 308.

Other sensor circuits, as necessary for other types of sensors, would also be suitable provided that they restrict the voltage range between +SPV and a minimum which is sufficiently above the ground voltage to avoid triggering reset circuit 236.

Separate Control Bus Design

FIGS. 7–13 illustrate a second embodiment of the invention in which a separate control bus carries the address signal. This design eases restrictions on the data that can be carried over the data bus that were imposed to prevent confusion between the digital address signal and the analog data when carried on the same bus as in the first embodiment. In the second embodiment, in addition to the vibration monitoring done with the accelerometers, it is possible to use the system in an auxiliary mode to provide basic two wire connections from the central controller to any one of the addressable sensor interfaces over any specified data bus without limiting the type of signals being sent.

As such, this embodiment is particularly suited for use where the system is intended for generalized control and data monitoring applications. This embodiment also provides modifications to allow multiple cables, each one servicing an additional set of addressable interfaces, remote controllers that perform the function of the central controller at any desired remote location, bypass bus capability, long line improvements and serial and parallel digital data outputs.

Figure 7:
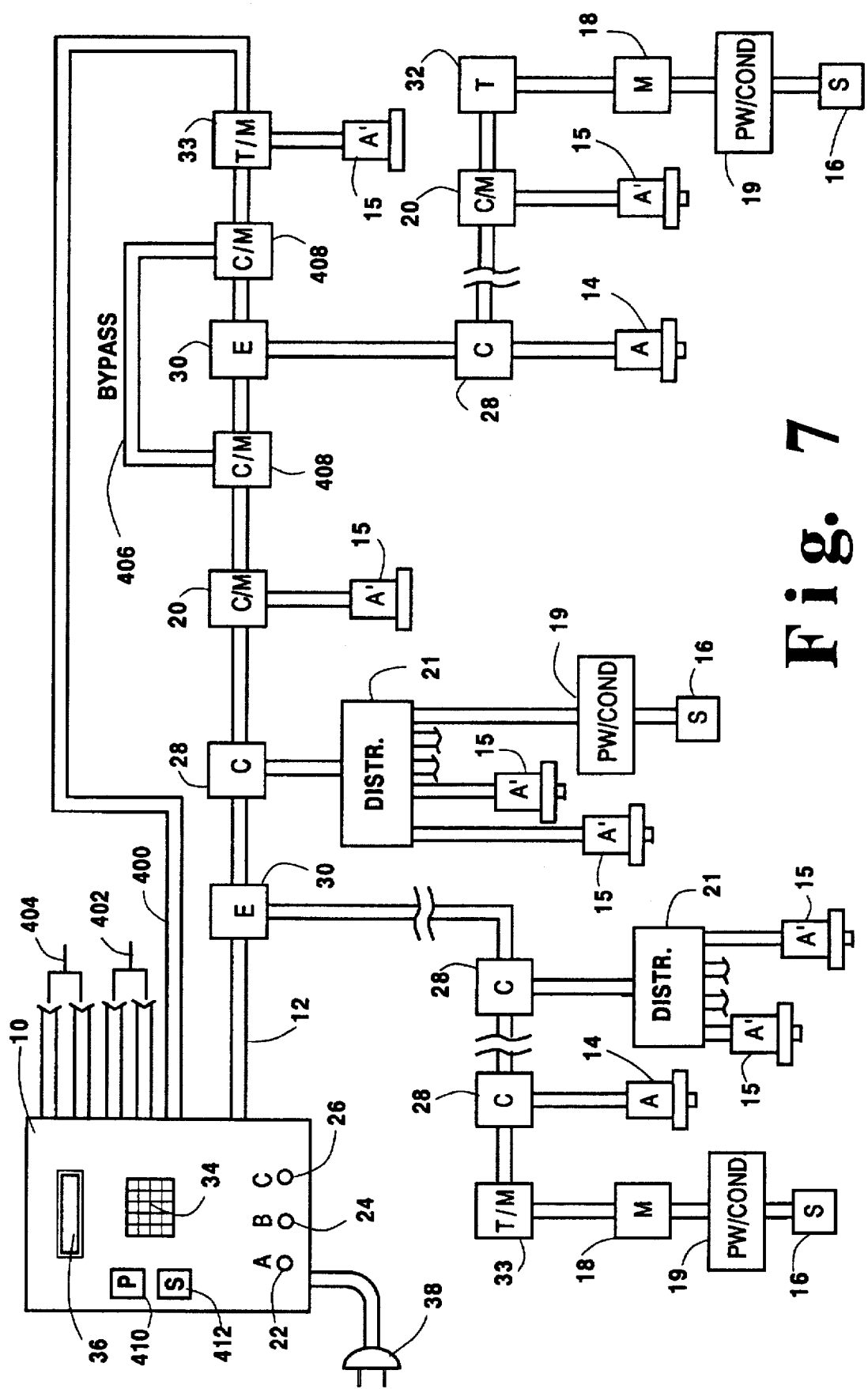
FIG. 7 illustrates the bus layout of the second embodiment of a monitoring and control system in accordance with the present invention in which a separate control bus is used.

FIG. 7 provides an overview of a control and data collection system according to the second embodiment of the invention. The central controller 10 is connected via cable 12 to multiple specialized accelerometers 14 and generic accelerometers 15 as previously described. However, in this embodiment, cable 12 forms a continuous loop returning to the central controller at its second end 400.

The central controller 10 is also provided with two additional cables 402 and 404 each of which comprises an additional cable arranged in a loop having both ends connected to the central controller. Each of these cables includes multiple addressable sensor interfaces of the type shown connected to cable 12. Either end of a cable may be used by the central controller to communicate with any sensor attached to the cable. Thus, if the cable is inadvertently cut in two, then the sensors on the portion of the cable connected to the first end of cable 12 are addressed and used through the first end, whereas sensors beyond the cut are addressed and used through the second end 400. The second end 400 can be used independently of the first end of cable 12 if the first end is disconnected. Connection and disconnection of the ends is done by relays or FET switches that operate under the direction of the central controller 10. Similar controllable switches are provided at the two ends of the other two cables 402 and 404.

This embodiment of the invention provides another feature that provides additional fault tolerance to the design, namely, a bypass bus 406 connected to C/M connector modules 408 at its two ends. The C/M connector modules 408 include sensor interfaces with unique addresses and are responsive to the address signal on the control bus to connect their respective end of the bypass bus 406 to a specified one of the data buses. In this way the bypass bus 406 can be used by the central controller to replace a damaged portion of a data bus in the cable or to bypass a portion of the sensor network that has a problem on it.

FIG. 7 also shows parallel and serial digital data outputs, 410 and 412 respectively, on the central controller. These outputs provide in digital form the same data that is available in analog form from the analog data outputs 22, 24 and 26.

Figure 8:
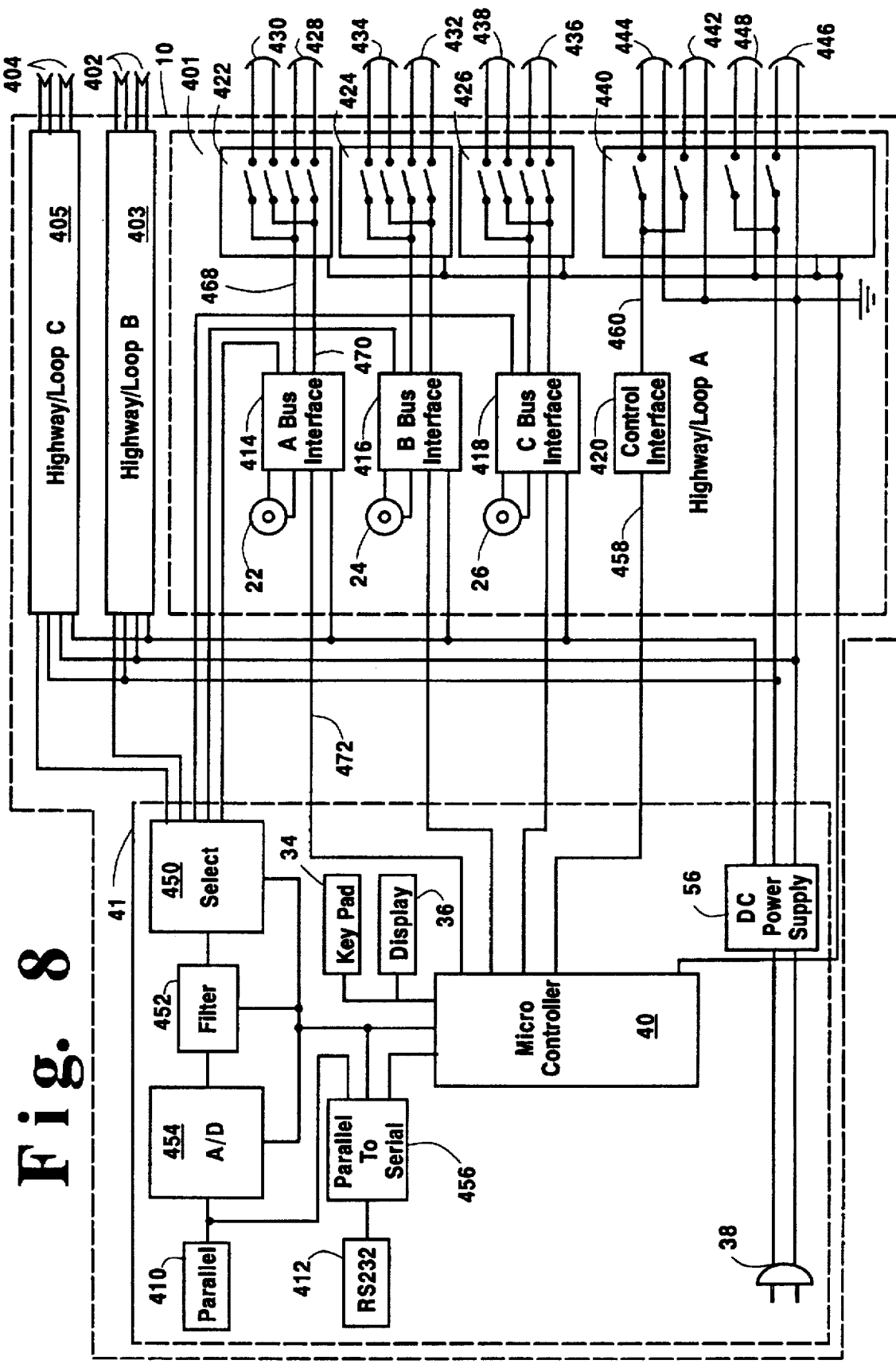
FIG. 8 is a circuit diagram in block diagram form showing the central controller of the second embodiment of the monitoring and control system seen in FIG. 7.

FIG. 8 is a block diagram of the central controller used in the second embodiment of the invention. The operation of the network is controlled by microcontroller 40. Microcontroller 40 operates the network over cables 12, 402 and 404, each of which is connected at both ends to the central controller through cable control modules 401, 403 and 405 respectively. Cable control modules 401, 403 and 405 are all identical and only cable control module 401 has been shown in detail.

Figure 11:
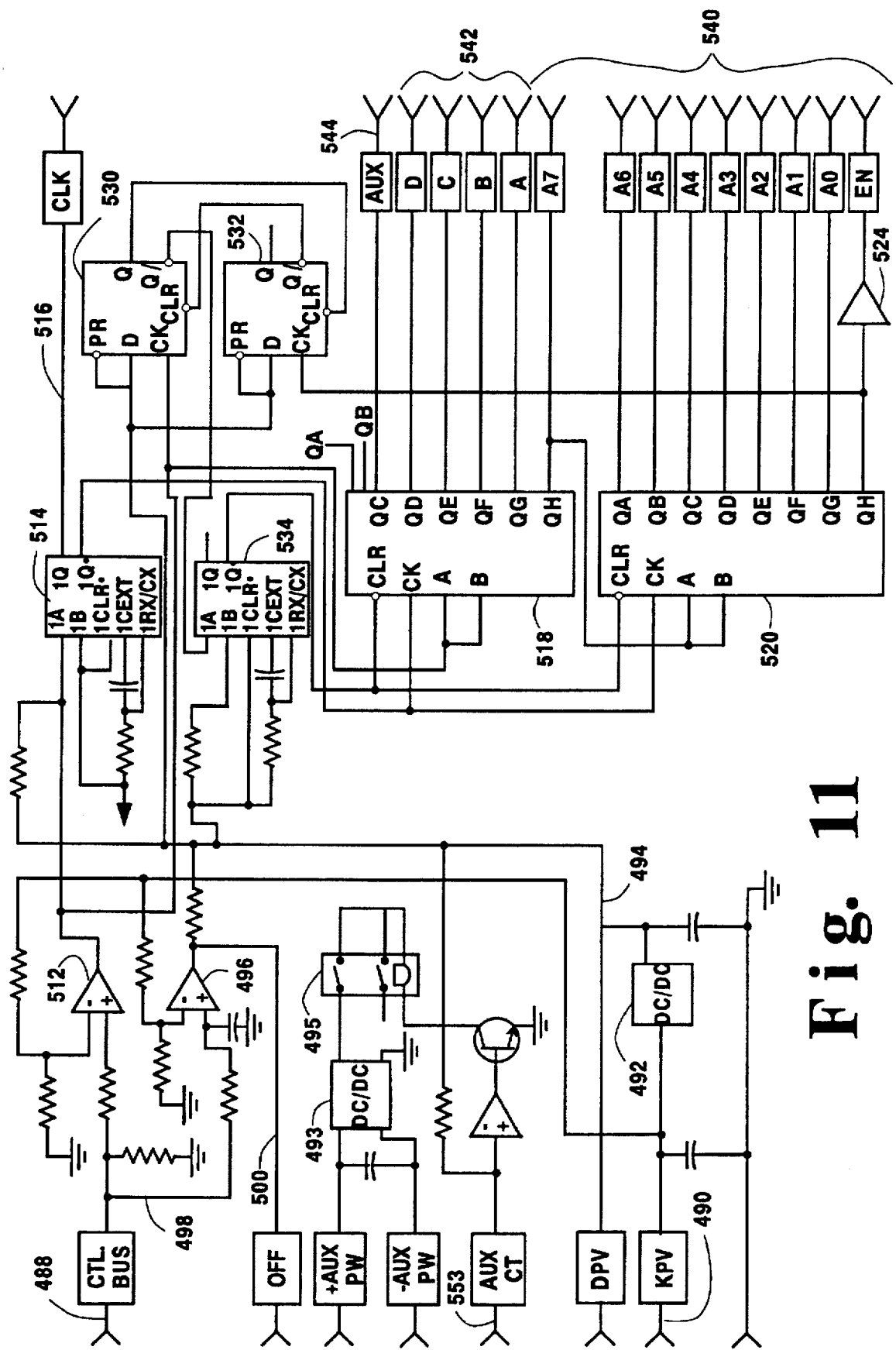
FIG. 11 is a circuit diagram of a first portion of a sensor interface used with the second embodiment of the monitoring and control system seen in FIG. 7.
Figure 12:
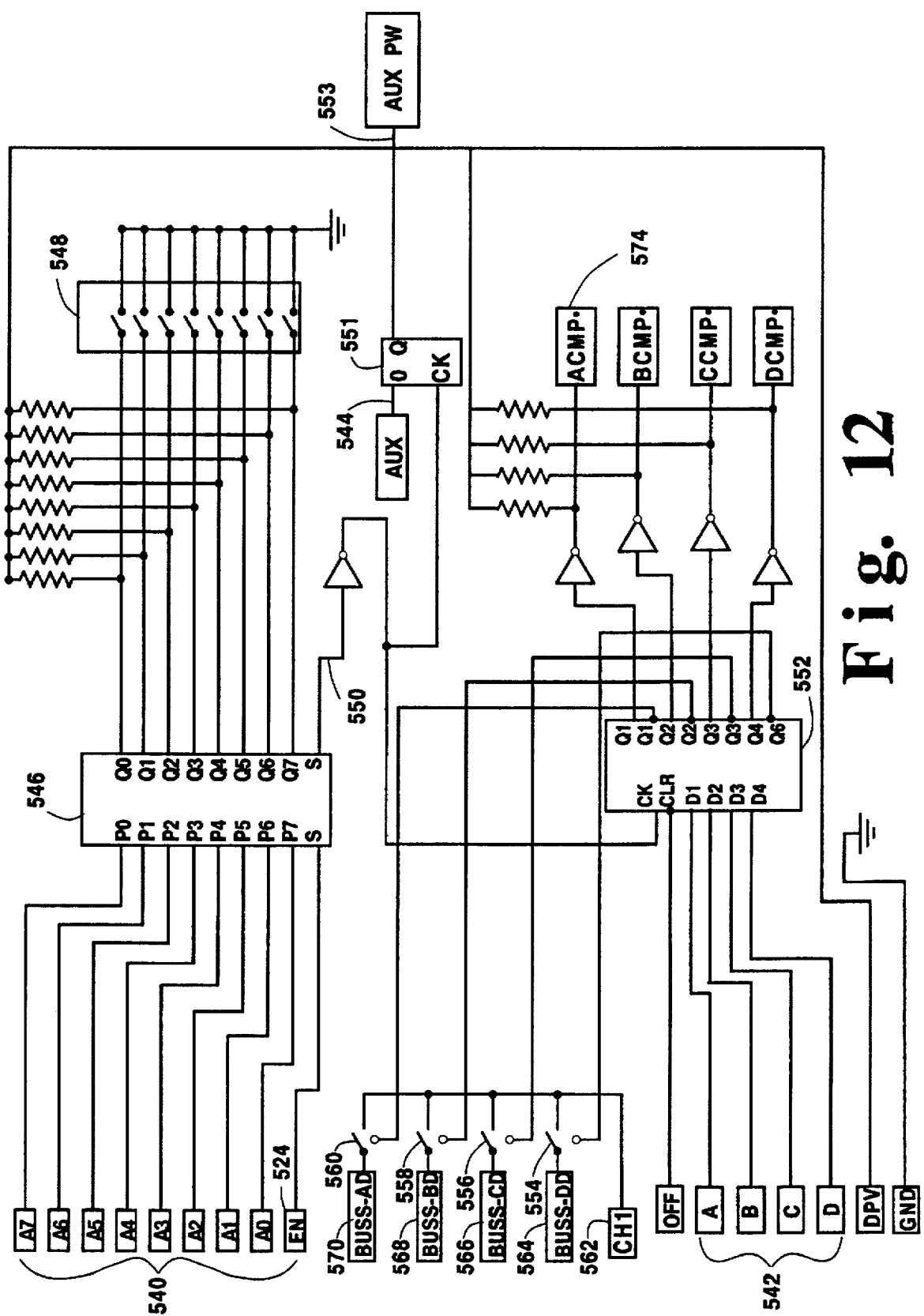
FIG. 12 is a circuit diagram of a second portion of a sensor interface used with the second embodiment of the monitoring and control system seen in FIG. 7.

Each of the cables 12, 402 and 404 includes multiple two wire buses, including: multiple data buses, a control bus and a power bus. Cable 12 is shown here as including three independent data buses, however more or less may be used, and by way of example, the sensor interfaces shown in FIGS. 11 and 12 are described for use with four data buses. Cables 402 and 404 are identical and are operated in the same way as cable 12 as described below.

Cable 12 includes a first end having three data buses with first ends 428, 432 and 436, a control bus with first end 442 and a power bus with first end 446. The cable 12 loops around bringing access to these buses to each sensor interface and returns to the central controller at its second end 400. This end includes the second ends of the three data buses 430, 434, 438, the second end of the control bus 444 and the second end of the power bus 448.

Bus interfaces 414, 416 and 418 operate under the control of microcontroller 40 and address signals are sent to the addressable sensor interfaces through control interface 420. The data buses are connected to the corresponding bus interface at both ends through switch assemblies 422, 424 and 426. Microcontroller 40 controls switch assemblies 422, 424 and 426 to selectively connect either end of the data bus to the corresponding bus interface.

Preferably, switch assemblies 422, 424 and 426 are relays with associated control electronics for making the connections under the command of the microcontroller 40, although other configurations with FET switches may also be used. In the auxiliary mode, the data outputs 22, 24 and 26 are directly electrically connected through relays to any addressable location on the system. This provides a direct wire pair connection to any location on the system so that different types of sensors, control devices, etc. can be used. In the auxiliary mode, the entire system can be used to turn on switches, measure temperatures, activate pumps, send data and receive data in both analog and digital form to any one of the addressable locations. In this way any desired type of equipment can be placed at the remote locations and accessed under control of the microcontroller. This is accomplished by sending and receiving data and control signals through data outputs 22, 24 and 26 to communicate with and control remote devices at the addressed location while operating the associated data bus in the auxiliary mode.

The address signals are sent by the microcontroller via the control interface 420 over the control bus through switch module 440. As in the case of the data buses, the wire pair forming the control bus has its first end 442 integrated into cable 12 and its second end 444 integrated into the cable at the second end 400.

DC power is provided to the address circuitry via DC power supply 56 which also uses switch module 440. The first end 446 of the power line is integrated into cable 12 and its second end 448 returns to the central controller through cable 400. This provides alternate operation for the control bus and the power line, as either end of the cable may be used to send the address signal and to supply power in the same way that either end of the data buses may be used.

FIG. 8 also shows how digital data can be provided at the serial 412 or parallel 410 data outputs under control of the microcontroller 40. Analog data arriving at the central controller on any one of the data buses can be selected via select module 450 and sent to an analog to digital converter 454 after anti-alias filtering in filter module 452. After conversion to digital form in analog to digital converter 454, the data is available from the parallel output 410 or from the serial output 412 after parallel to serial conversion in module 456.

It will be understood from the description above that the system has expanded fault tolerance. If a single data bus is interrupted, an alternate data bus may be used by the central controller. This is possible because sensor interfaces can be instructed to connect their sensor to any one of the multiple parallel data buses in the cable. If the entire cable is cut, the sensors may still be addressed by accessing them through the second end of the cable simply by instructing the switch modules 422, 424, 426 and 440 to use the second end of the cable instead of the first end.

In addition, areas may be provided with an alternate means of communicating with the central controller through a bypass bus such as bypass bus 406 shown in FIG. 7. Multiple bypass buses may be provided at various points along the main cable simply by adding additional modules 408 interconnected by an additional bus. If a fault occurs on a section that is provided with a bypass, the central controller may continue to operate the remaining portions by using the bypass bus. As described below, the bypass bus may be implemented to bypass a single data bus at a time, or it may be implemented to bypass all of the data buses as well as the control bus and the power bus.

Figure 9:
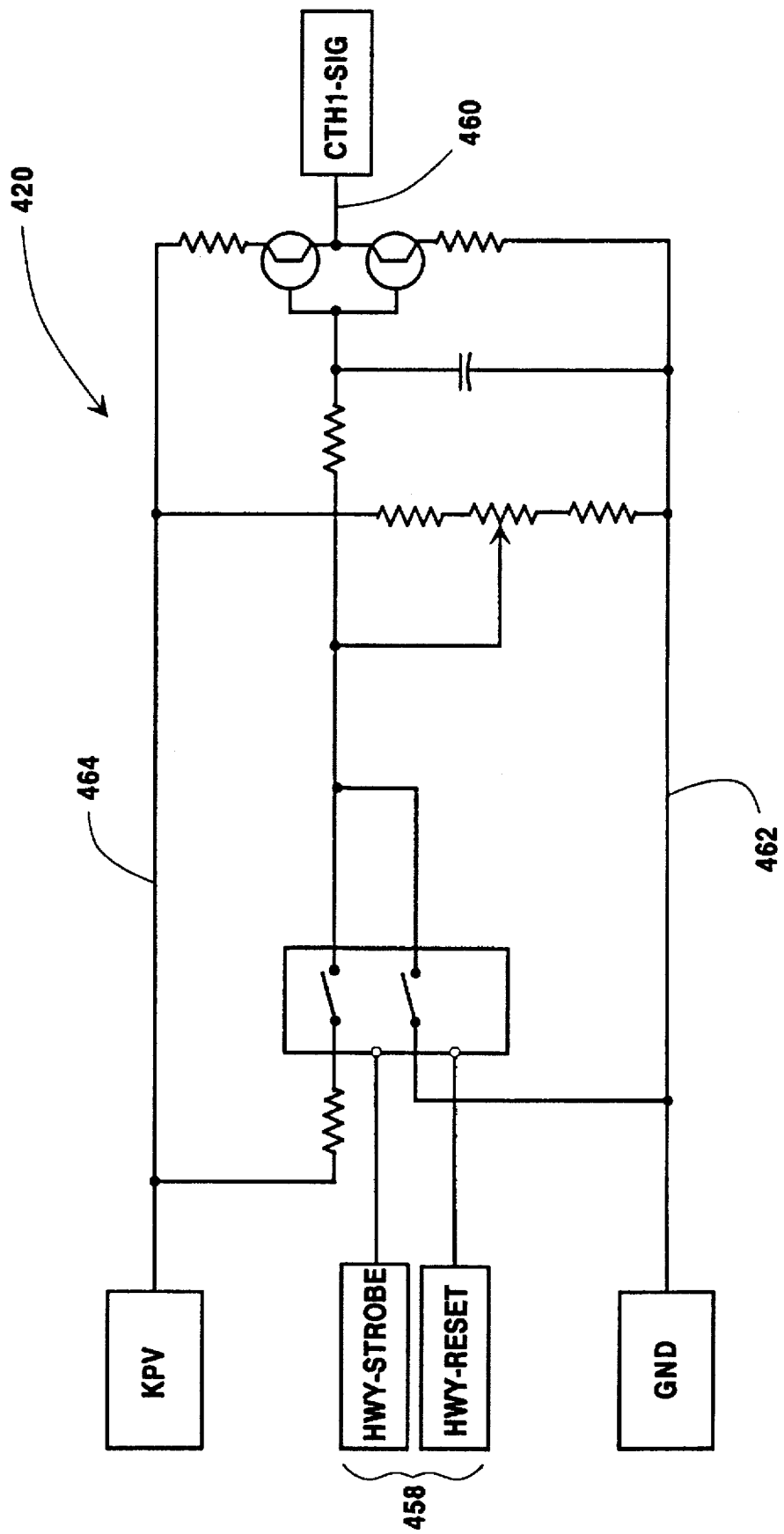
FIG. 9 is a circuit diagram of the control interface in the central controller shown in FIG. 8.

FIG. 9 provides a circuit diagram of the control interface 420 (seen in block diagram form in FIG. 8) which takes the address signal from the microcontroller over bus 458 and transmits it through the switch module 440 and out the appropriate end of the control bus. The control interface 420 is connected to ground 462 and power 464. The control interface principally acts to convert the digital address signal from the output range provided by microcontroller 40 to a different voltage range (ground to KPV) as is suitable for the address recognition circuitry in the sensor interfaces used with the preferred embodiment. Other types of digital signaling methods may also be used. The control interface also provides drive current for longer lines and additional sensors.

Figure 10:
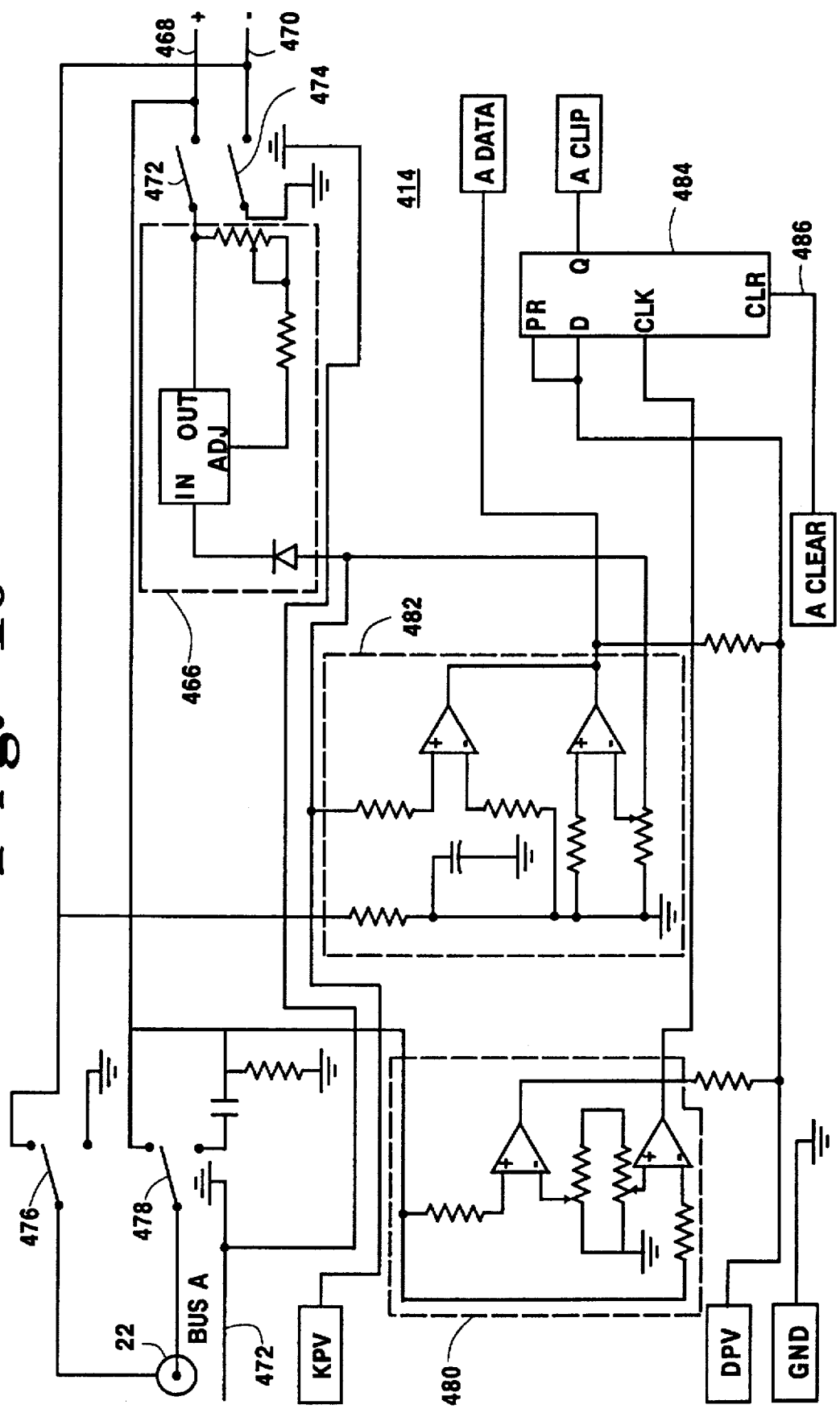
FIG. 10 is a circuit diagram of a bus interface shown in the central controller in FIG. 8.

FIG. 10 provides a circuit diagram of a bus interface used with this embodiment of the invention. The bus interface used with this embodiment of the invention is similar to the bus interface used with the first embodiment, but does not need to put the address signal on the data bus. Bus interfaces 414, 416 and 418 are all identical and, accordingly, only bus interface 414 is shown. If a fourth data bus is provided in the cable, a fourth bus interface would be used and an additional switch module similar to 422, 424 and 426 would be needed.

Bus interface 414 includes a constant current sensor power source 466 which provides constant current power to accelerometers over the data bus connected to the bus interface. Wires 468 and 470 connect to the associated data bus through switch assembly 422, as shown in FIG. 8. Switches 472 and 474 are preferably relays, operated under control of the microcontroller 40, to disengage the constant current power source 466 when the auxiliary mode is entered. In the normal mode of operation, the constant current power source 466 provides the constant current supply needed by the accelerometer sensors. In the auxiliary mode, this power source is not needed and might interfere with the devices to be connected during the auxiliary mode operation.

Switches 476 and 478 are similarly controlled by the microcontroller 40 when the auxiliary mode is entered. These relays allow a direct two wire connection between data output 22 and the data bus, without any connection to the constant current power source 466 or other electronics. Microcontroller 40 controls the bus interface 414 via controller line 472.

Circuits 480 and 482 monitor the incoming accelerometer data including the DC bias voltage and the AC data voltage to verify that the signal is in the valid range and is not being distorted as result clipping or saturation. They correspond substantially to the data monitoring modules 88 and 90 described in connection with FIG. 3 in the first embodiment of the invention, and, accordingly, will not be described in detail. Flip flop 484 operates in conjunction with data monitoring circuit 480 to hold any indication of error until acknowledged and cleared by the microcontroller 40 over line 486.

The function of the bus interface circuit in this embodiment is to provide constant current power to accelerometers and monitor the incoming data for validity when operating in the normal mode. In the auxiliary mode of operation, the bus interface circuit disconnects unneeded circuitry so that a two wire connection can be made from the central controller to any desired type of device connected at a remote point on the bus system.

The central controller shown in FIGS. 8, 9 and 10 may be replicated to form a remotely located controller that may be connected anywhere along the cable to provide all of the features of the central controller at a remote operating location. when the remote controller is connected to the cable, it instructs the central controller to disconnect itself from the cable by opening the relays in switch modules 422, 424, 426 and 440.

Figure 13:
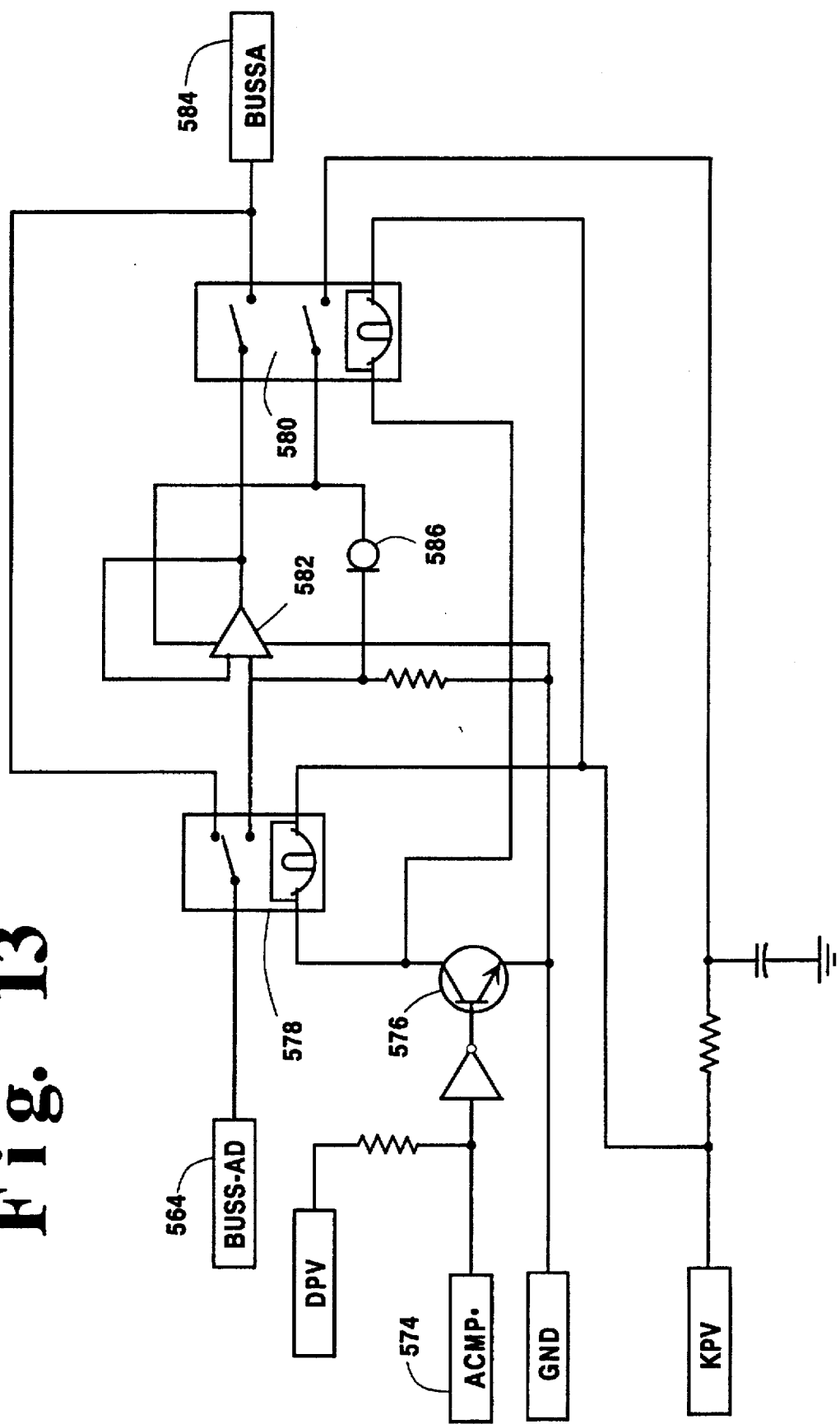
FIG. 13 is a circuit diagram of an optional line driver used with the second embodiment of the monitoring and control system seen in FIG. 7.

FIGS. 8, 9 and 10 and the discussion thereof complete the description of the electronics in the central and remote controllers. FIGS. 11 through 13 show the sensor interfaces used with these controller in the second embodiment. These sensor interfaces are found in the individual C/M modules, in the distribution boxes (which act as multiple C/M modules, with some circuitry being shared), in the 408 modules at the end of the bypass bus, and may also be incorporated into the accelerometer 14 itself.

FIGS. 11 and 12 taken together show the circuit diagram of a single sensor interface. As described in connection with the distribution module 21, it is often desirable to place several sensors in the same general location, e.g., to monitor several points on a pump or other vibrating machinery. It is less expensive to do this by connecting the sensors to a single box, i.e., the distribution module 21, in which common circuitry can be shared instead of duplicating the circuitry for each sensor.

FIGS. 11 and 12 are divided between the circuitry that can be shared for several sensors (FIG. 11) and circuitry that cannot be shared and is needed for each sensor to be addressed (FIG. 12). In distribution box 21 there will be one instance of the circuitry in FIG. 11 which will be shared and will service all of the sensor interfaces in that box. The circuitry in FIG. 12, however, will be duplicated according to the number of sensor interfaces in the box. The circuit in FIG. 13 is a long line driver, and as will be described below, there is one instance of this circuit for each data bus connected to the distribution box.

Referring to FIG. 11, the signal lead of the control bus wire pair 442 connects to the sensor interface at 488, the other member of the control bus wire pair is connected to ground. As previously described, the control bus 442 and the remaining buses in the cable continue, being connected to each of the multiple sensor interfaces. The cable may optionally return to the central controller, in which case, either end of the buses in the cable may be selected and used. It will be noted that the buses are driven from a single end at a time, and a continuous loop connection is not needed for proper operation.

Power is supplied to the sensor interface at 490 which is connected to the looped power bus 446 and 448. Power supplied at 490 is regulated and converted to the correct lower DC voltage via voltage regulator 492 and supplied to the remainder of the circuit over power lead DPV 494. The power circuitry 493 and relay 495 are used during switching of auxiliary power to power auxiliary devices having specific power needs. Relay 495 is controlled by flip-flop 551 over line 553 when the auxiliary mode is in use and a sensor interface address match has been found by 546 as described below.

Voltage level comparator 496 is used to recognize a CLEAR signal 502 in the address signal shown in FIG. 14A. The CLEAR signal 502 precedes the rest of the address signal and is used to reset all sensor interfaces prior to sending the signals that identify the sensor interfaces to be connected and the buses to which they should be connected. Voltage level comparator 496 and its associated resistors and capacitors are connected to the control bus 488 via wire 498. When the negative going CLEAR signal 502 is applied to the control bus, voltage level comparator 496 generates a signal over OFF line 500.

Referring to FIG. 14A, the address sequence in an address signal is initiated by negative going CLEAR signal 502. This pulse resets the circuitry for each sensor interface and initializes it to accept the following four address signal portions 504, 506, 508 and 510. Each of these address signal portions includes 16 bits. The individual bits in these address portions are not shown in FIG. 14A. FIG. 14B shows one address portion with the 16 bits being shown in detail. The first bit of each address portion is always a digital one and is used to signal the start of the address portion. The next eight bits constitute the unique sensor interface address to specify a selected sensor interface. The next four bits are the bus address to specify the bus that the sensor should be connected to. The next bit specifies whether the auxiliary mode should be used. The remaining bits are not used, but are available if more data buses are to be used. Clearly, other bit arrangements are also possible.

The sensor interface shown in FIGS. 11 and 12 is intended for use with cables which include up to 4 independent data buses. The central controller shown in FIGS. 8, 9 and 10 has only been illustrated with 3 independent data buses, although a fourth can be added without difficulty. Additional data buses may also be included if desired.

The positive going bits in the address portions 504, 506, 508 and 510 are detected by voltage comparator 512 in FIG. 11. Voltage comparator 512 is connected to single shot 514 which produces clock pulses on line 516 as shown in FIG. 14C. The clock pulses strobe in the address bit immediately following each clock bit as previously described in connection with the sensor interface for the first embodiment. The address signal from 512 is also fed into two 8 bit shift registers 518, 520 connected together to form a single 16 bit shift register. The address portions 504, 506, 508 and 510 each include 16 bits, and these bits are sequentially shifted into the 16 bit shift register formed by 518 and 520. The first bit in one of these portions is always a one as indicated by bit 522 in FIG. 14B. Prior to receiving this bit, the shift register was cleared, and accordingly, when all 16 bits have shifted into the registered, the QH output of register 520 contains the first bit and will switch from zero to one to activate the ENABLE line 524 after 16 clocks.

When ENABLE line 524 changes state, this signals the fact that the sensor interface address and bus address can now be validly read from the outputs of 8 bit shift registers 518 and 520. The seven outputs QA-QG of shift register 520 and the QH output of shift register 518 contain the 8 bits of the sensor interface address marked as A0 through A7. Immediately after this follows the bus address in outputs QD-QG of shift register 518. In the preferred embodiment, the first bit following the sensor address corresponds to bus A, the second bit corresponds to bus B, the third bit to bus C and the fourth bit to bus D (if used). Additional buses can be added as desired. However, since this embodiment only uses 4 data buses, the following bit which arrives at output QC of shift register of 518 is used to signal whether the selected data bus is to operate in the auxiliary mode. Outputs QA and QB of shift register 518 are not used but are available for further expansion of the system.

Referring to FIG. 14B, the first bit of the sensor interface address 522 will be found in output QG of shift register 520 and the last bit of the sensor interface address 526 will be found in the QH output of shift register 518. The bus address shown as an example in FIG. 14B has a one in bit 528 which will arrive at output QG of shift register 518 and indicate that bus A is to be used by the sensor interface with the matching sensor interface address.

Flip flops 530 and 532 act to form a window during which the sensor address and bus address are entering the shift register 518 and 520. When the first bit, which is always one, as described above, enters the shift register, it also enters flip flop 530 and triggers it. When that bit reaches the QH output of shift register 520, it triggers flip flop 532 which resets flip flop 530. This in turn activates single shot 534 which then resets and clears the shift registers 518 and 520 prior to receiving an additional 16 bit address. This reset action occurs between the 16 bits in each of the address portions 504, 506, 508 and 510, but timing is such that the reset and clearing of the shift registers occurs after the data has been read and acted upon for the previous address portion.

Accordingly, when the shift registers 518, 520 have been fully loaded with the 16 bits in the incoming address portion, A0 through A7 marked with the reference numeral 540 will contain the sensor interface address of the selected sensor interface and A-D marked with reference numeral 542 will contain the bus address. Output 544 will contain the bit signaling if the auxiliary mode is to be entered.

Referring to FIG. 12, the sensor interface address bits on outputs 540 are connected to an 8 bit compare chip 546. When the ENABLE line 524 indicates that the addresses are valid and have been loaded into the shift registers 518, 520 the 8 bit compare chip 546 compares the specified address to the actual address of the sensor interface set in switch unit 548. Switch unit 548 is set to a unique address for each sensor interface. It may be manually set with mechanical switches, or an electronically settable address may be used as in the first embodiment.

It will be understood that FIG. 12 represents the circuit for each sensor interface connected to the bus. Accordingly, the compare described above will occur simultaneously in each of the sensor interfaces connected to the control bus. Only one of the sensor interfaces will have the specified address and only one will generate a match out of its 8 bit compare chip 546. When a match is found by 546, output 550 changes state and chip 552 is signaled to connect the sensor associated with this sensor interface to the bus address specified in the bus address outputs 542.

Outputs 542 will be indicating one of the data buses for use, and that data bus will be used by chip 552 to close one of the switches 554, 556, 558 and 560. These switches are preferably relay operated to provide direct mechanical connection between the sensor connection point 562 and the specified data bus connected to points 564, 566, 568 and 570. Where the auxiliary mode with direct electrical connection is not needed, these may be FET switches or some other type of electronic switch.

As will be seen from the description above, the sensor connection point 562 may have a sensor connected to it, such as an accelerometer, or it may have a bypass bus connected to it, or it may be connected to a generic control device. As a result of the sensor interface address and bus address specified in the address portion, the sensor connection point 562 will be connected to the appropriate data bus A, B, C or D which will usually be connected to points 564, 566, 568 and 570, respectively.

The description of the bypass bus previously given has assumed that the bypass bus is a single data bus that is connected to the sensor connection point of a standard sensor interface and switched into operation by addressing the sensor interface and instructing it to bypass a specified one of the data buses. It can also be seen that the sensor interfaces at the two ends of the bypass bus may be given the same address so that they switch together when addressed.

In an alternate bypass configuration, the output 550 from the 8 bit compare chip 546 may be used to switch multiple relays (or a single multipole relay) on all of the data, control and power buses to bypass the entire cable onto a bypass cable containing separate two wire pairs for each of the data, control and power buses. The relays for this bypass cable design have two positions, one in which the incoming buses are connected up to the normal outgoing buses, and a second in which the incoming buses are connected to the corresponding bypass buses in the bypass cable.

When the sensor interface in FIGS. 11 and 12 is close to the central controller, the accelerometer sensors normally used with this system may be directly connected to the data bus and the sensor will directly drive the data bus to deliver data to the central controller. However, when the distance between the central controller and the sensor interface is too great, it is difficult for the accelerometer to drive the data bus directly. In this case, a long line driver such as is shown in FIG. 13 may be used to drive the long line and reliably transmit data to the central controller. The long line driver of FIG. 13 must be positioned between the sensor connected to sensor connection point 562 and the data bus. In the preferred design, this is done by connecting it between the connection points 564, 566, 568 and 570 and the associated data bus A–D.

Referring to FIGS. 12 and 13, when chip 552 connects the sensor connection point 562 to data bus A on line 564, it also switches output 574 connected to the long line driver of FIG. 13. This causes the relay driver 576 to drive relays 578 and 580 and connect driver 582 between input 564 and output 584 connected to bus A. In this manner, a long line driver for each bus is switched into use when that bus is selected.

When relay 580 operates, its lower half switches in constant current power diode 586 and connects power to driver 582. This allows constant current power to be supplied locally. Moreover, it means that when the long line driver is not in use, it does not draw power, which is important if large numbers of sensors are on the system.

The line driver is particularly useful in the distribution box 21 design as 4 line drivers, one for each bus, can be shared among more than 4 sensors, in the same way that the common circuitry in FIG. 11 is shared. Only one line driver is needed for each data bus, and which ever data bus is selected will have its associated line driver connected at the appropriate time.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

Thus, having described the invention, what is claimed is:

1. A multipoint control and data collection system comprising:

a plurality of parallel data buses forming a cable, each data bus being connected to carry data collected by the multipoint control and data collection system, and not connected to carry an address signal for controlling the system;

a control bus included in the cable, the control bus being connected to carry the address signal for controlling the multipoint control and data collection system, and not connected to carry data collected by the system;

a central controller including:
      a plurality of bus interface circuits corresponding to the plurality of parallel data buses, each bus interface circuit being connected to the corresponding data bus for receiving the data over the corresponding data bus,
      a control interface circuit connected to the control bus, the control interface circuit being adapted to send the address signal over the control bus, the address signal specifying a sensor interface address and a selected one of the plurality of data buses; and a plurality of sensor interfaces having corresponding sensor interface addresses, each sensor interface being connected to more than one of the data buses, each sensor interface including a sensor connection point adapted for connection to a sensor and each sensor interface including an address recognition circuit connected to the control bus, the address recognition circuit of each sensor interface being responsive to the address signal on the control bus to connect the sensor connection point to the selected one of the plurality of data buses specified in the address signal when the corresponding sensor interface address of the sensor interface is included in the address signal, and the address recognition circuit of each sensor interface ignoring the data carried on the data buses.

2. A multipoint control and data collection system according to claim 1 wherein each of the plurality of data buses has a first end and a second end and each bus interface circuit is selectably connectable to the first end or the second end of the corresponding data bus to receive data over the corresponding data bus via the selected first or second end.

3. A multipoint control and data collection system according to claim 1 wherein at least two of the sensor interfaces are connected together via a bypass bus connected to the sensor connection points of the at least two sensor interfaces, whereby the bypass bus may be used to carry data when the sensor interface addresses of the at least two sensor interfaces are specified in the address signal.

4. A multipoint control and data collection system according to claim 1 further including:

a second plurality of parallel data buses forming a second cable;

a second control bus included in the second cable;

the central controller further including:
      a second plurality of bus interface circuits corresponding to the second plurality of parallel data buses, each of the second plurality of bus interface circuits being connected to the corresponding one of the second plurality of data buses; and
      a second control interface circuit connected to the second control bus.

5. A multipoint control and data collection system according to claim 1 wherein the central controller further includes a sensor power supply for applying sensor power over the selected one of the plurality of data buses specified in the address signal to the sensor interface having the sensor interface address specified in the address signal.

6. A multipoint control and data collection system according to claim 5 wherein the sensor power supply comprises a constant current source.

7. A multipoint control and data collection system according to claim 1 wherein the central controller includes a first plurality of auxiliary mode connection switches connected to corresponding ones of the plurality of data buses, and the plurality of sensor interfaces include a second plurality of auxiliary mode connection switches also connected to corresponding ones of the plurality of data buses, the first and second plurality of auxiliary mode connection switches operating under the control of the central controller to switch between a normal operating mode to supply sensor power to a specified sensor interface over a selected data bus and an auxiliary mode to make a direct connection to a specified sensor interface over a selected data bus.

8. A multipoint control and data collection system according to claim 1 wherein the central controller further includes an analog to digital converter selectably connectable to a specified one of the plurality of data buses for providing digital output data from analog data received by the central controller.

9. A multipoint control and data collection system according to claim 8 wherein the central controller further includes a parallel output connected to the analog to digital converter for providing parallel digital output data.

10. A multipoint control and data collection system according to claim 8 wherein the central controller further includes a serial output connected to the analog to digital converter for providing serial digital output data.

11. A multipoint control and data collection system according to claim 8 wherein the central controller further includes a filter connected to the analog to digital converter for filtering analog data prior to converting the analog data to digital data.

12. A multipoint control and data collection system according to claim 1 further including a plurality of line drivers connected to corresponding ones of the plurality of data buses at locations remote from the central controller.

13. A multipoint control and data collection system according to claim 12 wherein the plurality of line drivers include a local constant current power source.

14. A multipoint control and data collection system according to claim 12 wherein the plurality of line drivers are unpowered when not in use.

15. A multipoint control and data collection system according to claim 1 wherein the central controller further includes an input means for selecting a desired sensor.

16. A multipoint control and data collection system according to claim 1 further including a remote controller, adapted to control the multipoint control and data collection system, connected to the plurality of parallel data buses and the control bus in the cable at a point remote from the central controller.

17. A multipoint control and data collection system according to claim 1 further including a bypass cable having a plurality of parallel bypass data buses and a bypass control bus connected to two sensor interfaces for switching the first plurality of parallel data buses and the first control bus onto the bypass cable.

18. A multipoint control and data collection system according to claim 1 wherein the central controller further includes a plurality of data output means connected to corresponding ones of the plurality of parallel data buses.

\* \* \* \* \*